Nov. 12, 1957   A. D. GUNDERSON   2,812,695
MULTIPLE SPINDLE AUTOMATIC DUPLICATING MACHINE
Filed Dec. 23, 1954   14 Sheets-Sheet 1
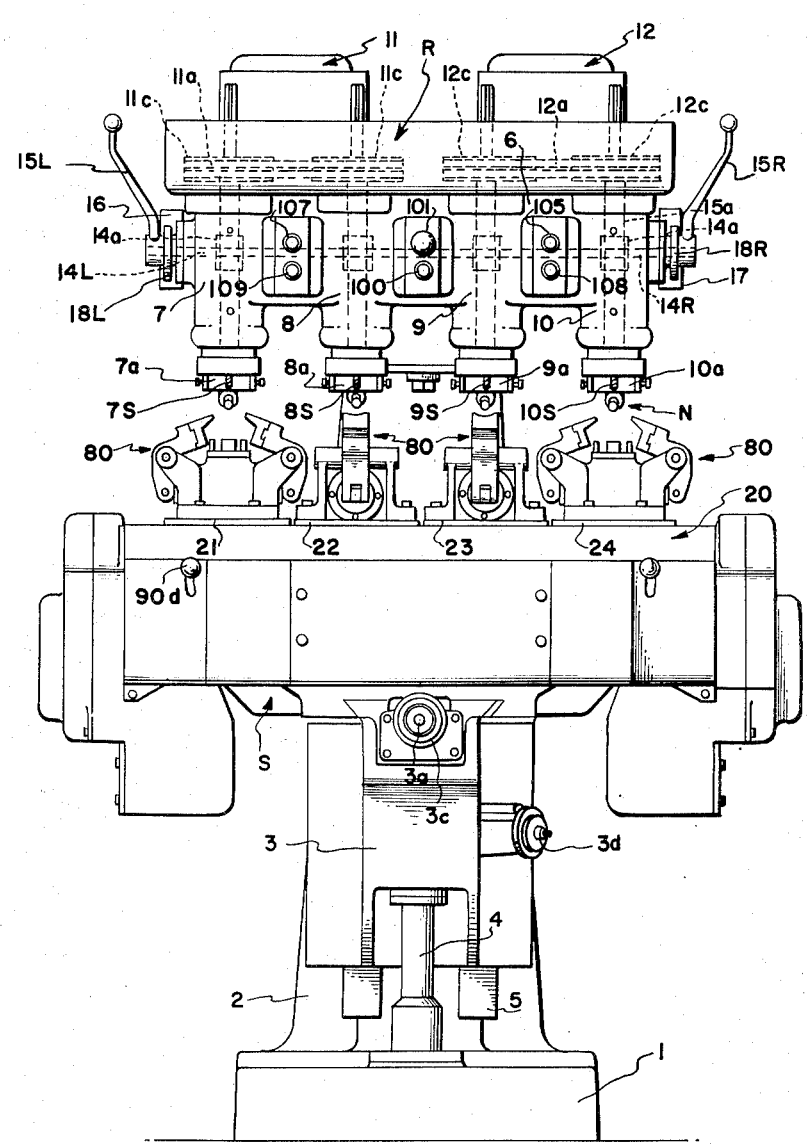
INVENTOR:
Allen D. Gunderson
BY Peck + Peck
ATTORNEYS.

Nov. 12, 1957 A. D. GUNDERSON 2,812,695
MULTIPLE SPINDLE AUTOMATIC DUPLICATING MACHINE
Filed Dec. 23, 1954 14 Sheets-Sheet 2
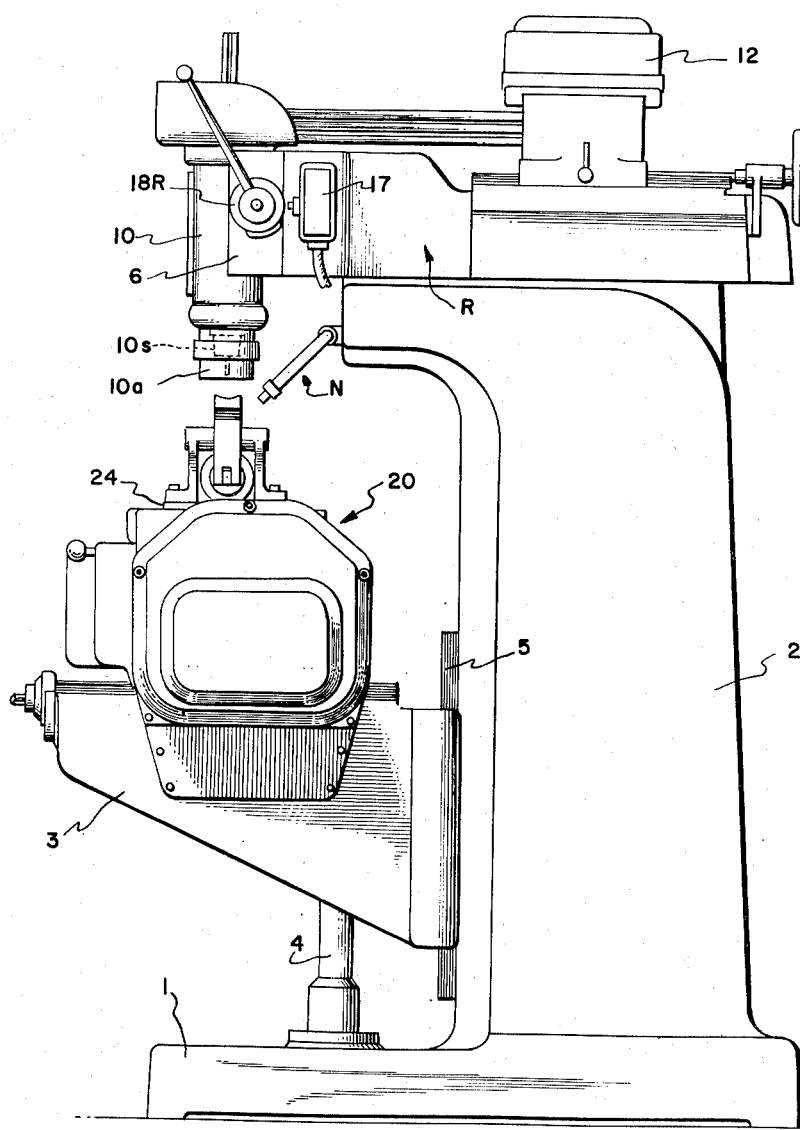
INVENTOR:
Allen D. Gunderson
BY Peck & Peck
ATTORNEY

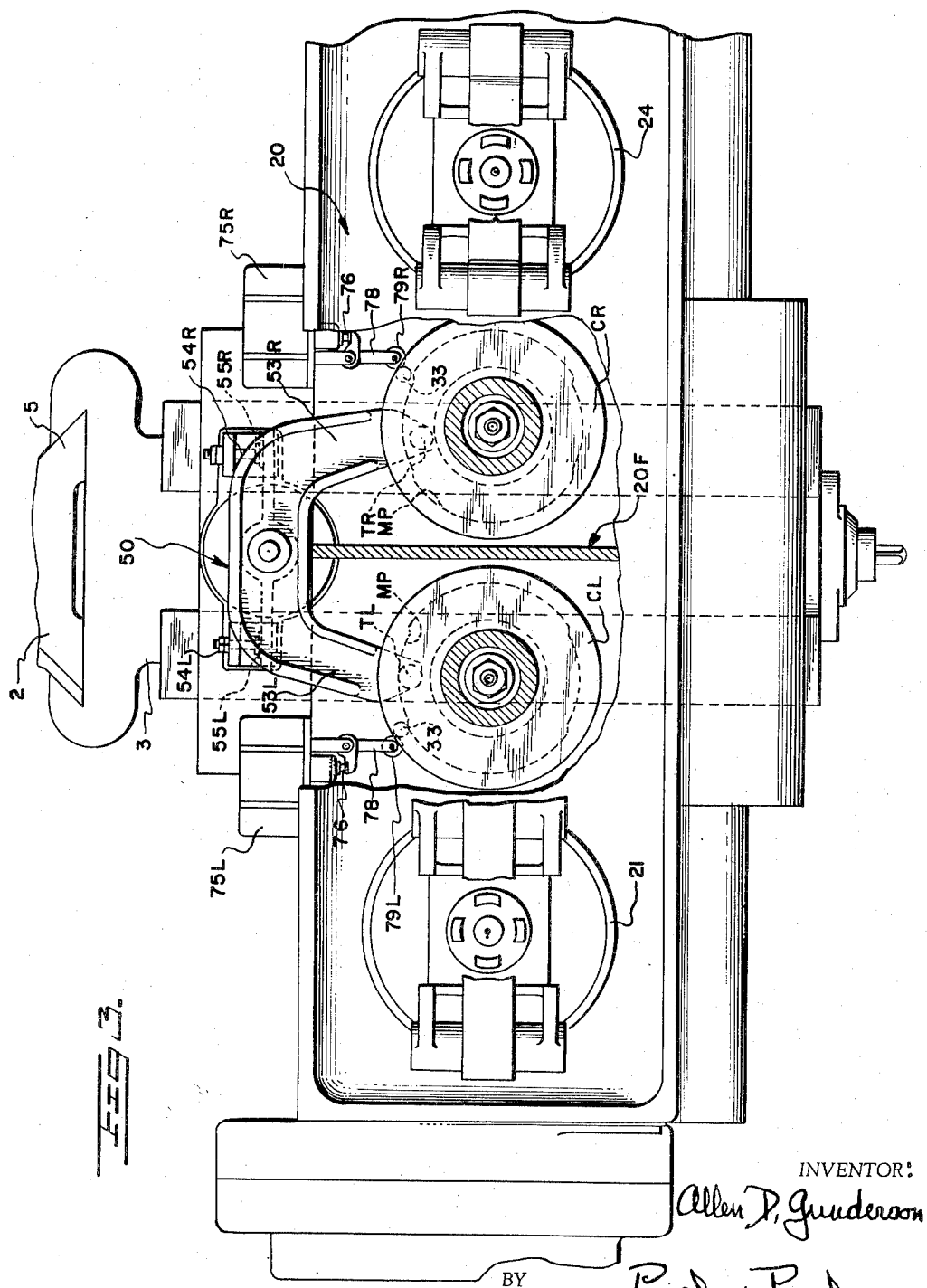

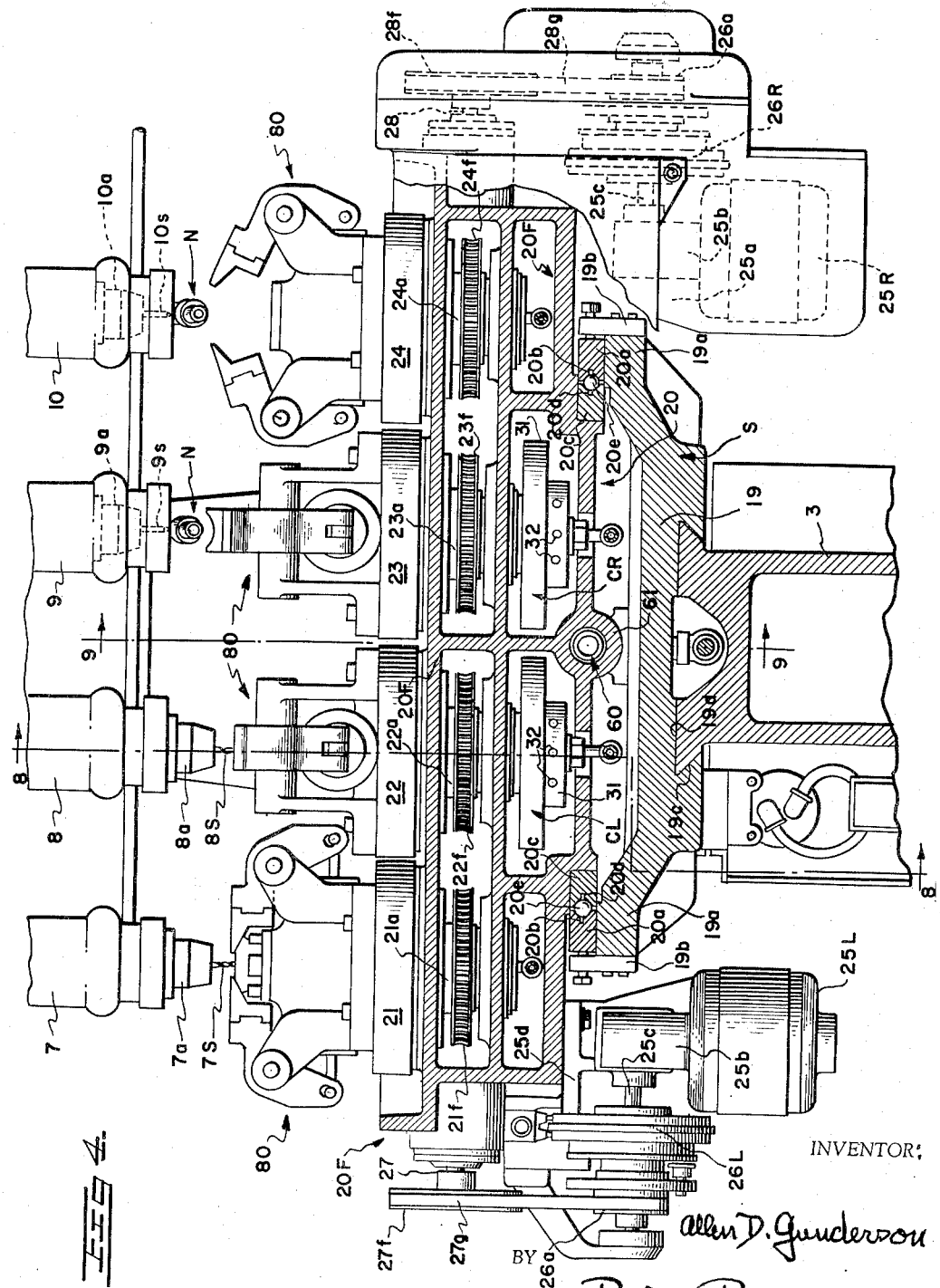

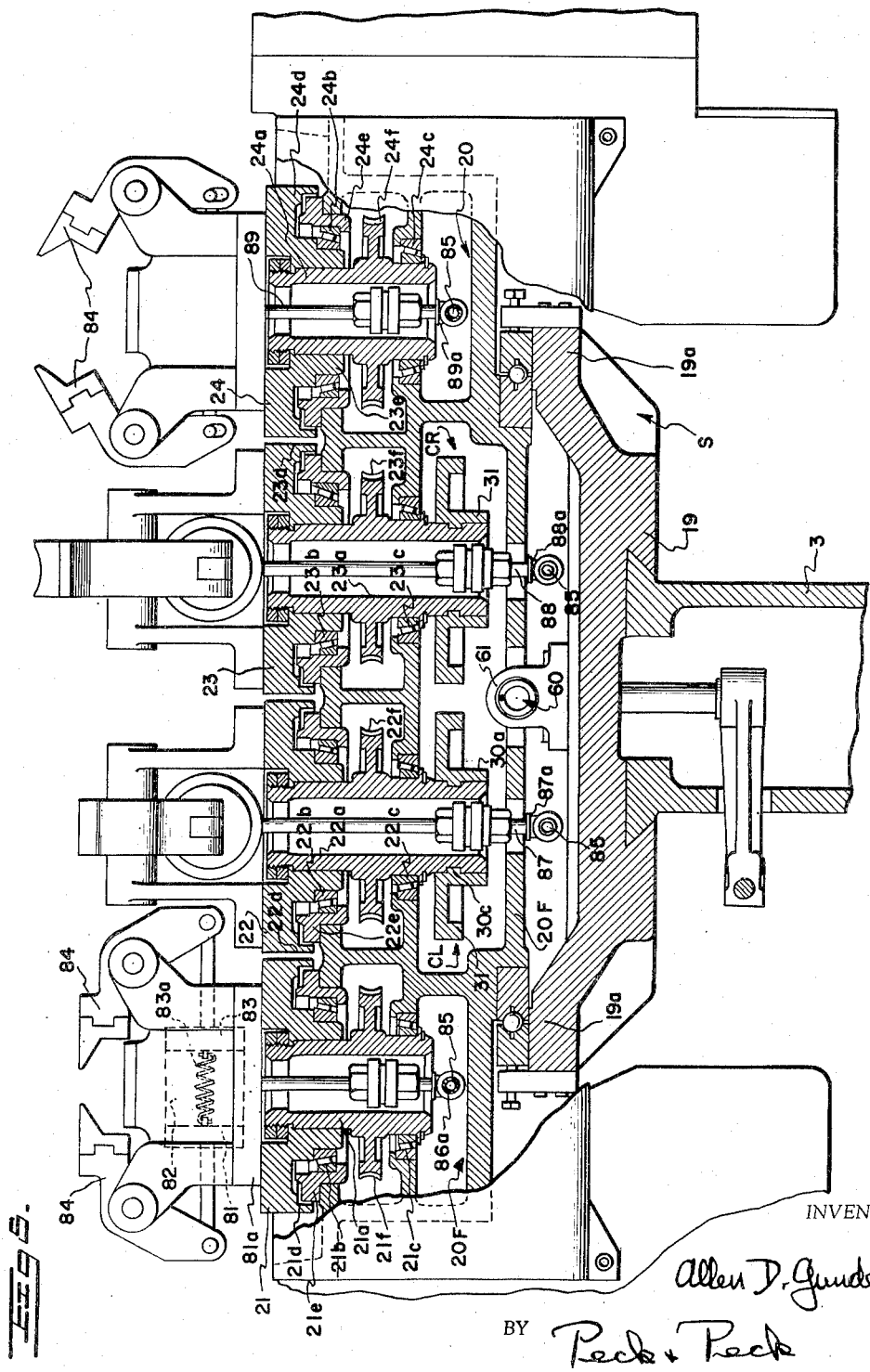

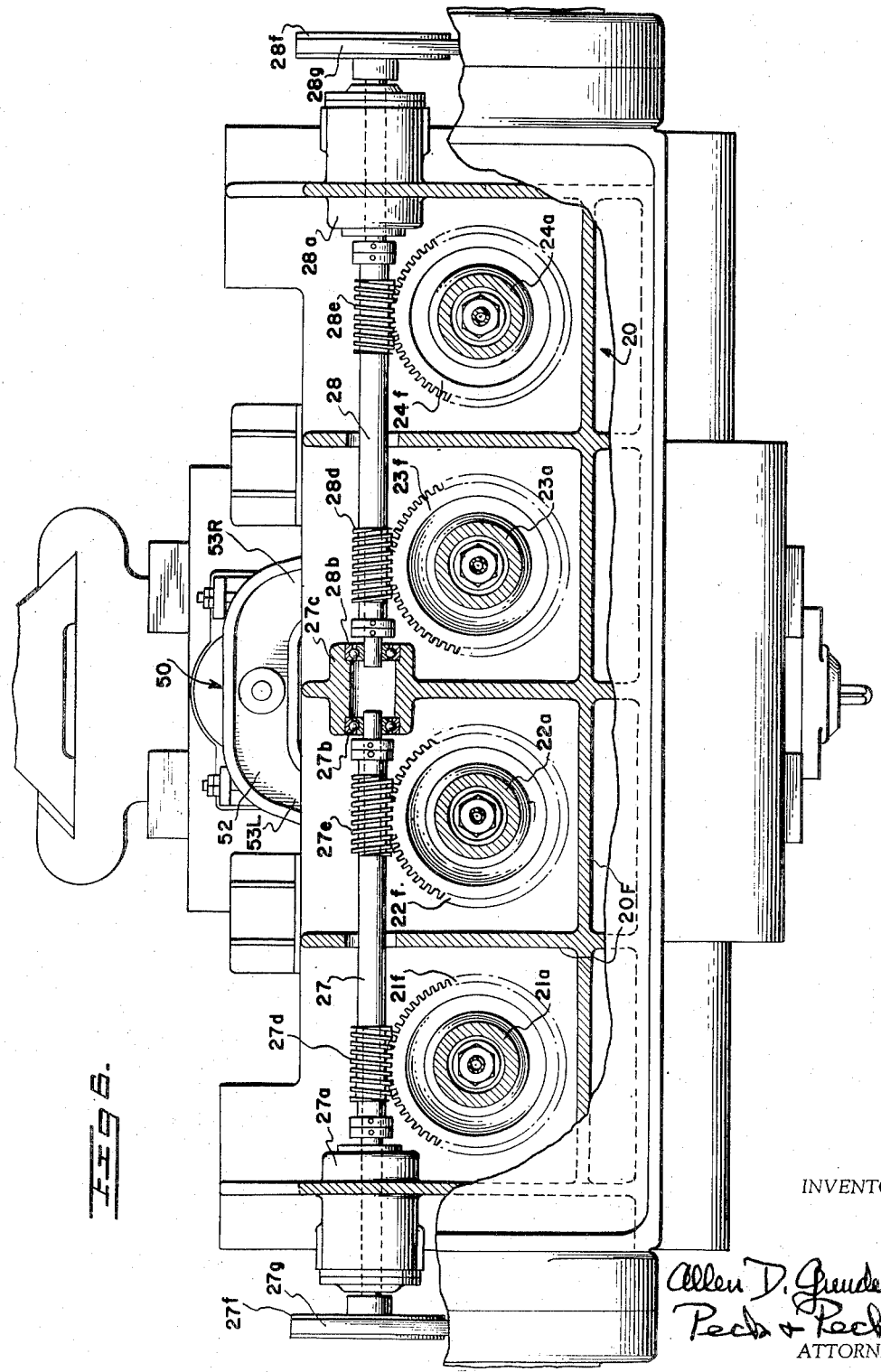

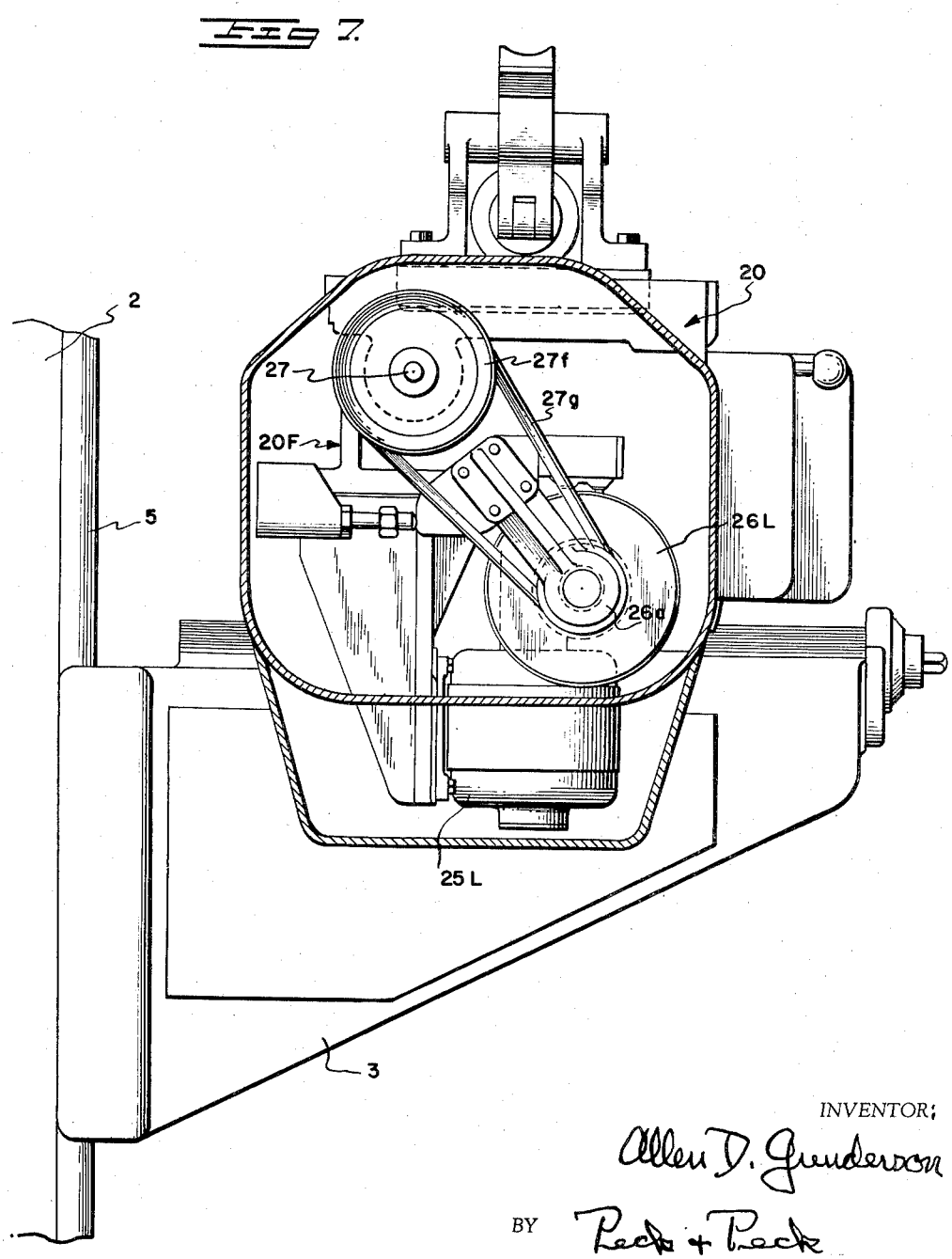

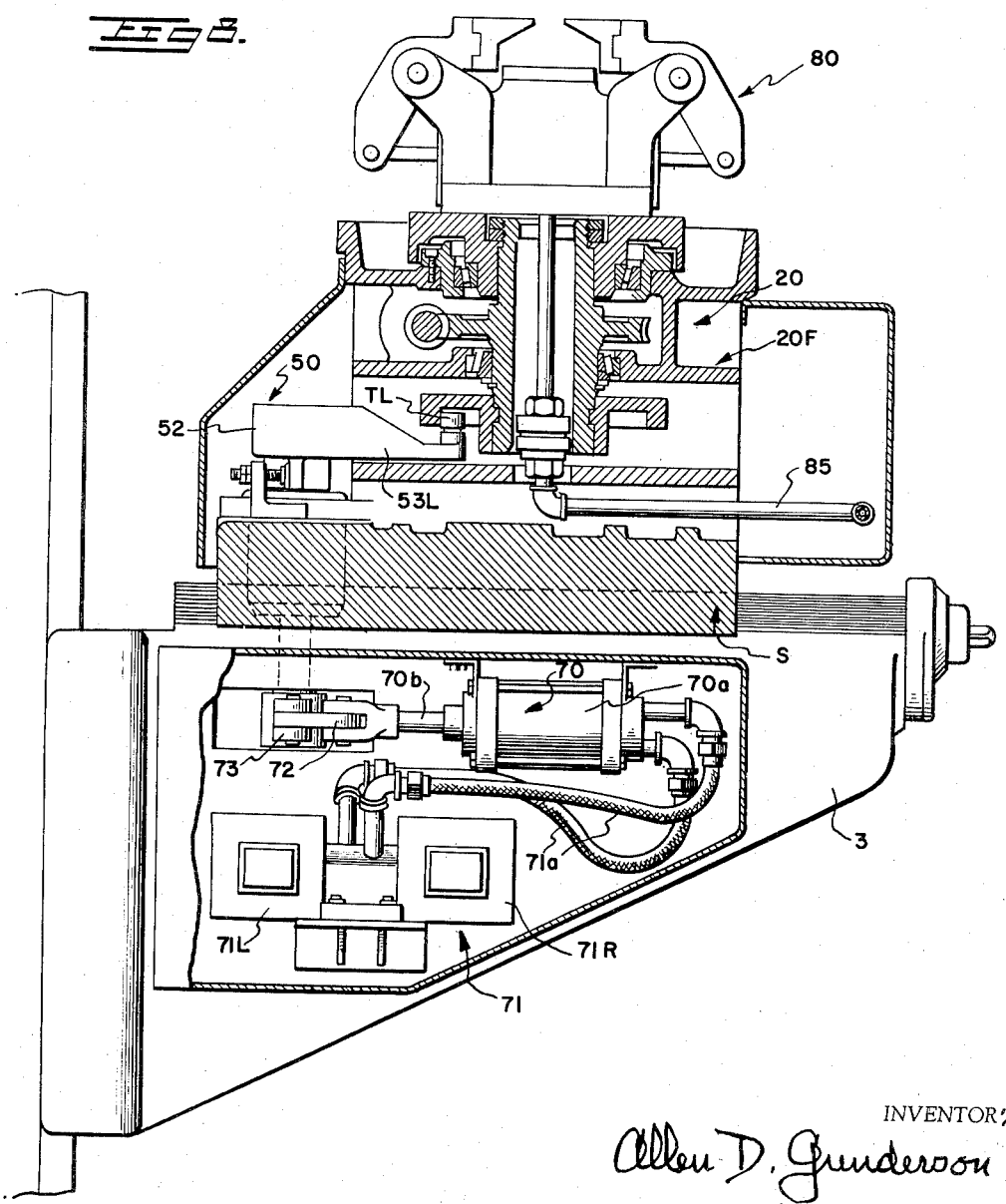

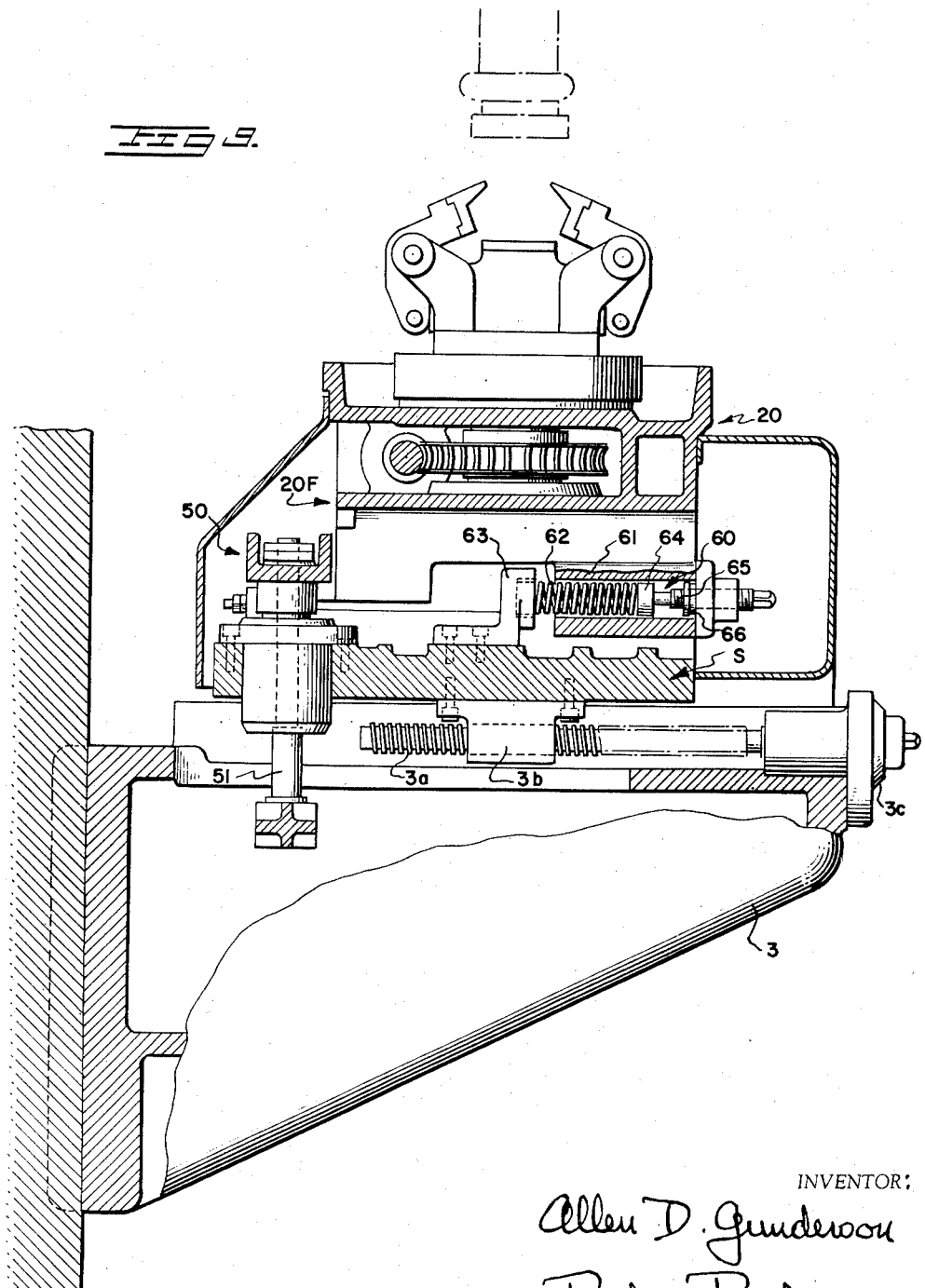

Nov. 12, 1957   A. D. GUNDERSON   2,812,695
MULTIPLE SPINDLE AUTOMATIC DUPLICATING MACHINE
Filed Dec. 23, 1954   14 Sheets-Sheet 10
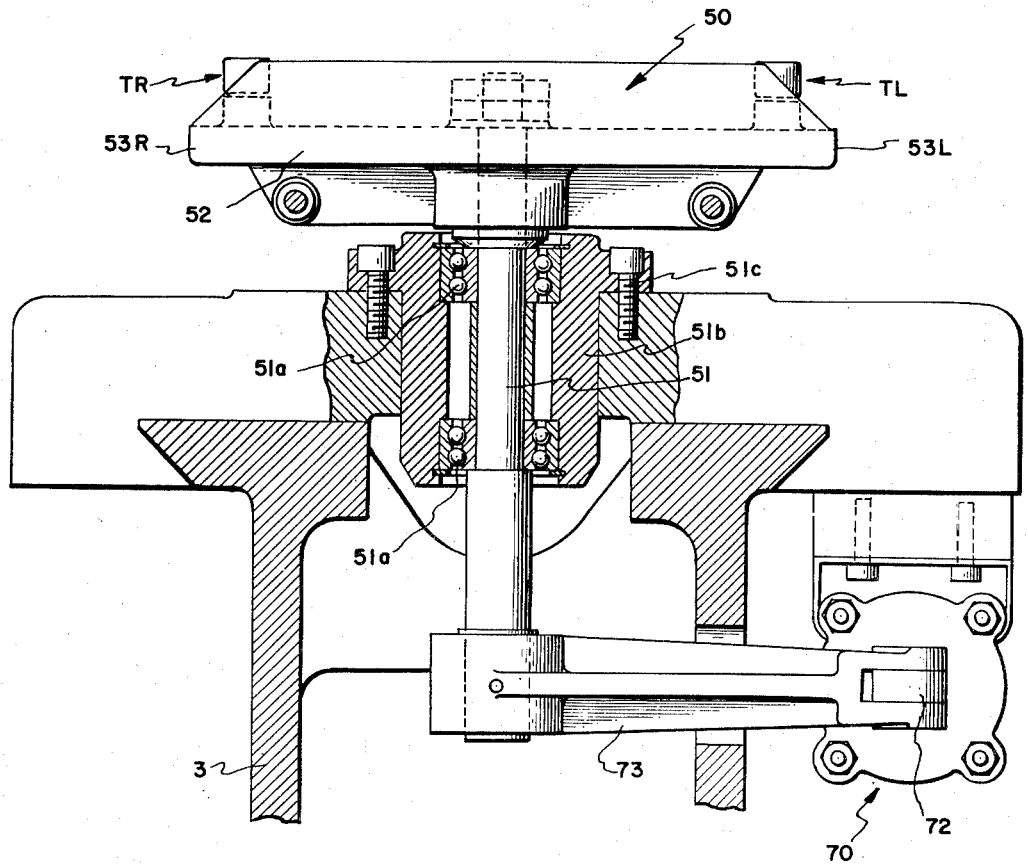
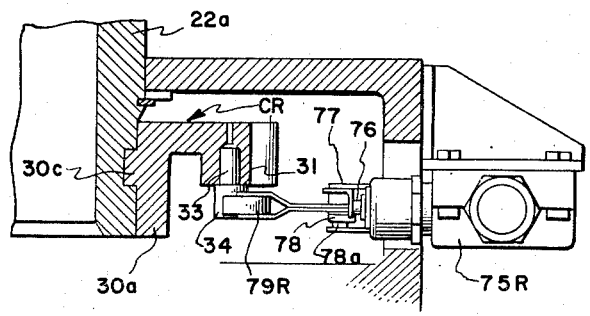
INVENTOR:
Allen D. Gunderson
BY Peck & Peck
ATTORNEYS

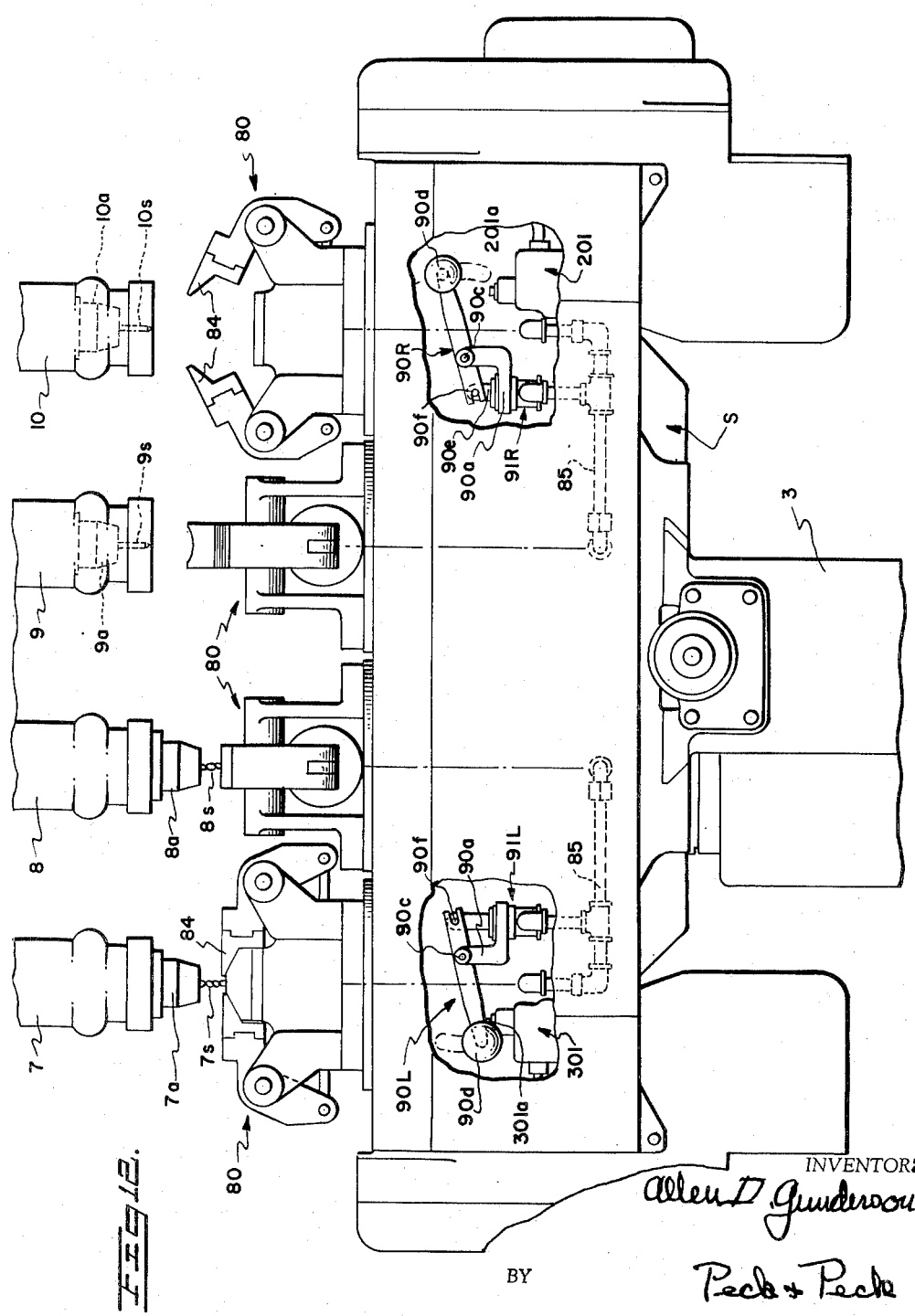

Nov. 12, 1957  A. D. GUNDERSON  2,812,695
MULTIPLE SPINDLE AUTOMATIC DUPLICATING MACHINE
Filed Dec. 23, 1954  14 Sheets-Sheet 12

INVENTOR:
Allen D. Gunderson
BY Peck + Peck
ATTORNEYS

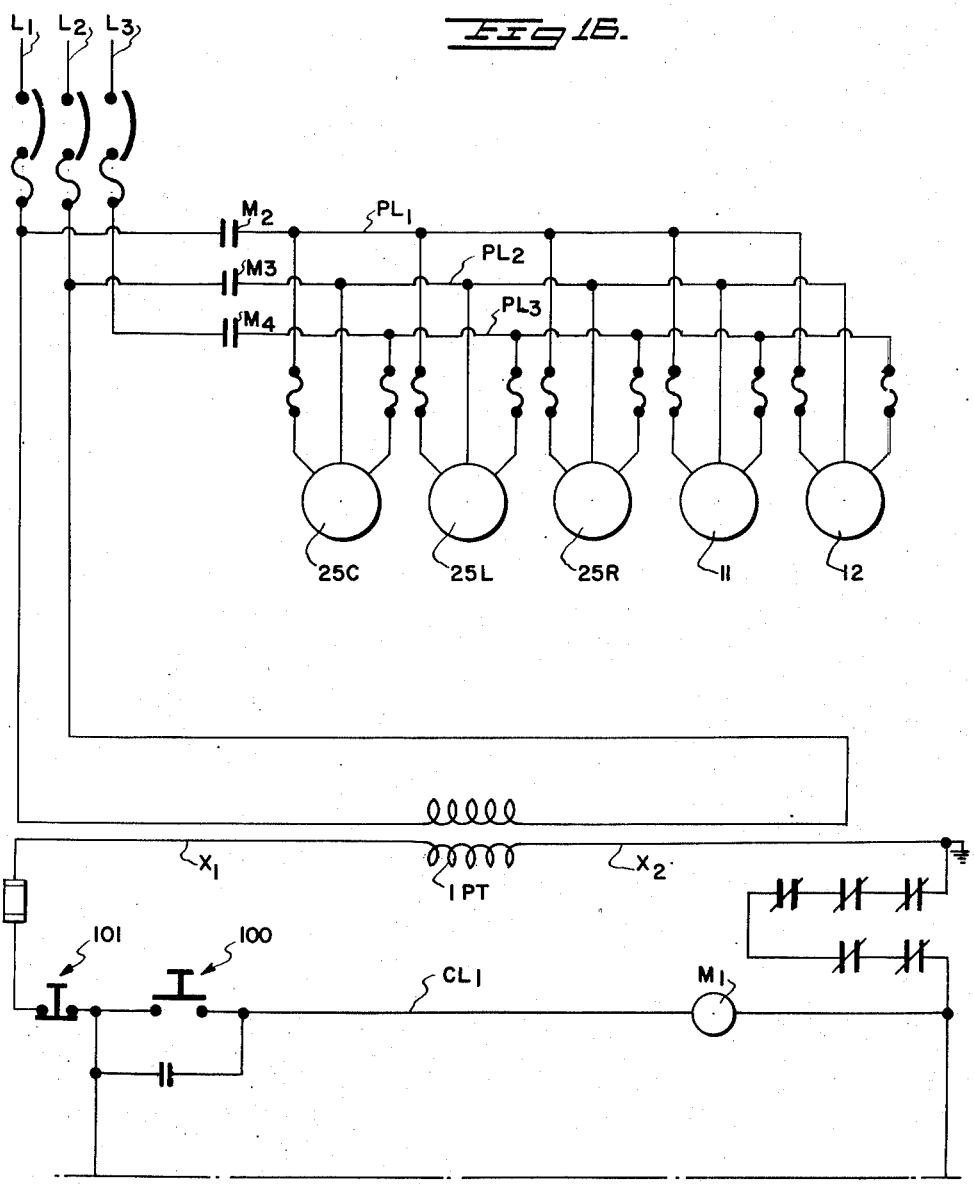

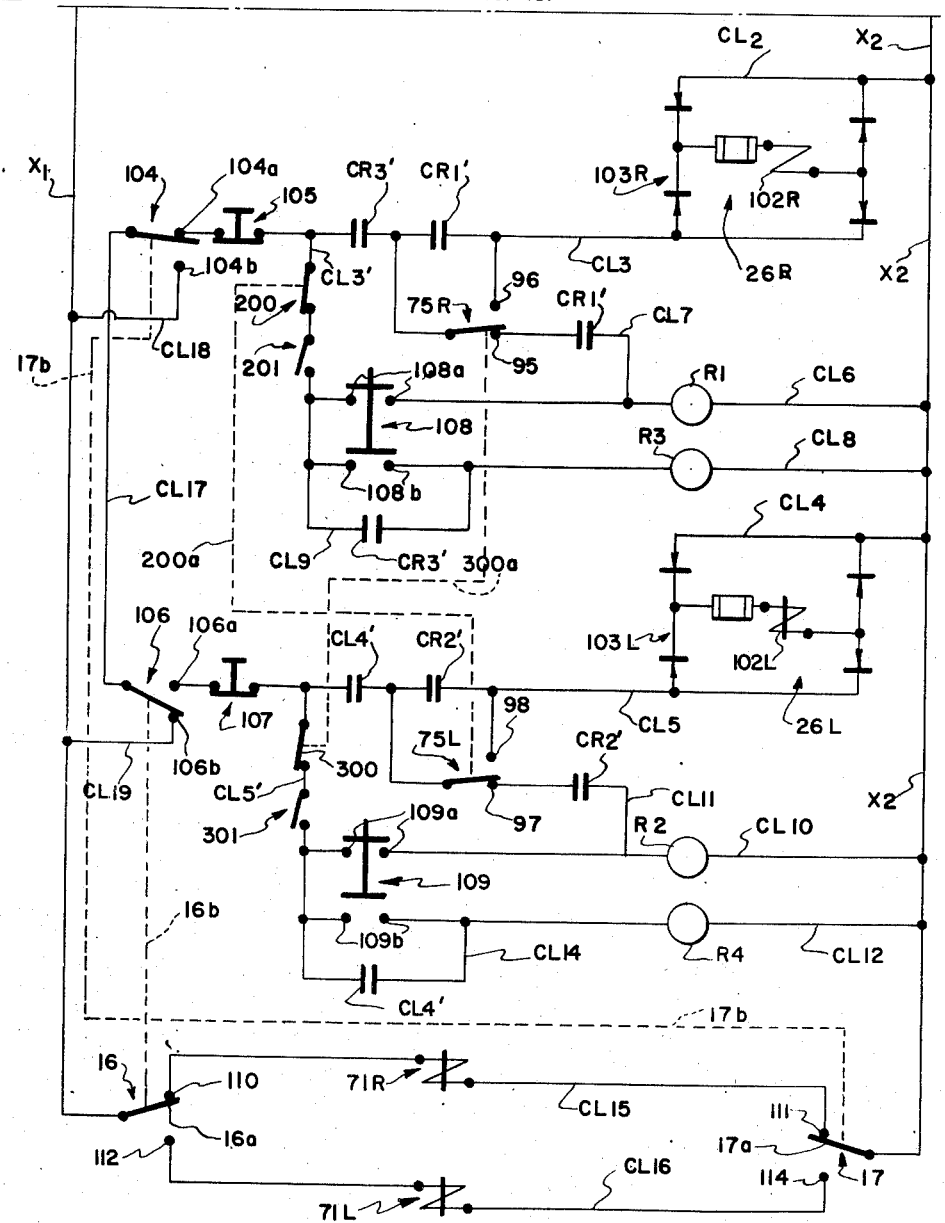

United States Patent Office 2,812,695
Patented Nov. 12, 1957

2,812,695

MULTIPLE SPINDLE AUTOMATIC DUPLICATING MACHINE

Allen D. Gunderson, Racine, Wis., assignor to George Gorton Machine Co., Racine, Wis., a corporation of Wisconsin Application December 23, 1954, Serial No. 477,196

19 Claims. (Cl. 90—13.4)

My present invention relates to automatic duplicating or milling machines of the multiple spindle type; and the nature and objects of the invention will be readily recognized and understood by those skilled in the art from the following explanation and detailed description of the accompanying drawings illustrating what I at present consider to be a preferred embodiment or structural and mechanical expression of the invention from among various other embodiments, forms, designs, constructions, arrangements and combinations of which the invention is capable within the broad spirit and scope thereof as denfied by the claims hereto appended.

A primary and general object of the invention is to provide a multiple spindle duplicating or milling machine for efficiently automatically profile milling a plurality of work pieces simultaneously in precise, scaled reproduction of a master profile.

Another object is to provide such a machine of the multiple spindle and multiple worktable type in which the spindles and worktables are arranged in groups or sets for profile milling operation of one group of spindles and worktables with the other group in an inactive position out of operation for work piece loading on the worktables of that group and for profile milling operation of the latter loaded group when the operating group has completed its profiling operations and is then being loaded.

A further object is to provide such a precision profile milling or duplicating machine in which the work pieces are rotated in operative relation with the cutter spindles about axes parallel with the work spindles while being moved bodily in either direction along a straight-line path relative to the spindles by and under the dictation and control of a master profile cam for milling or duplicating on the work piece a profile surface in precise scaled reproduction of the profile of the master cam.

A further object is to provide such a master cam controlled profile milling machine of the multiple spindle type in which the worktables for receiving and mounting the work pieces are continuously rotated during milling operations while being movable bodily in either direction along and constrained to a straight-line path under the control and dictation of and following the master profile on a rotary master cam to thereby precisely reproduce such master profile on the work pieces on such worktables.

Another object is to provide an arrangement by which a rotary master profile cam is provided for controlling the bodily movements along the straight-line path of the rotary worktables for each group of cutter spindles with such rotary master profile cams being selectively operable to disengage the master cam from operative relation with one group of rotary worktables when the other master cam is in operative profile milling controlling engagement with the other group of worktables.

A further object is to automatically control the selective operation of the master cams in accordance with the group of cutter spindles placed in operative profile milling relation with the worktables for such group of cutter spindles.

Another object is to provide an arrangement of rotary master profile cams and tracer members having fixed operative positions by which the master cams are carried by a worktable assembly mounted for cross-movements along a straight-line path relative to the tracer members with the workable assembly being continuously yieldingly biased in one direction along that path to yieldingly maintain a master cam in tracing engagement with a fixed tracer member.

Another object is to provide an arrangement of rotary worktables mounted for bodily movements in either direction constrained along a straight-line path in profile milling relation with rotary cutter spindles in which a system of rotary master cams having thereon annular master profiles controls the straight-line movements bodily of the rotating worktables relative to the rotary cutter spindles in a manner to mill annular profile surfaces on work pieces on said worktables as precise reproductions in reduced scale angularly of the master profile on a master cam.

A further object is to provide for profile milling on the rotary worktables of one group a profile surface different from that milied on work pieces on another group of the rotary worktables, or for milling the same profile surface on work pieces on all of the groups of rotary worktables, or for milling a profile surface on work pieces by successive profile milling steps performed in sequence on successive groups of the worktables.

Another object is to provide the rotary worktables with work piece clamping mechanisms thereon and to interlock such mechanisms with the drives for the groups of rotary worktables in a manner such that when the clamping mechanisms of a group of worktables are in open, work-receiving positions the worktables of that group cannot be set into rotation by the operator until the clamping mechanisms are fully closed to work clamping positions.

Another object is to so interlock the power drives for rotating the worktables that each set or group of worktables must complete a profile milling operation cycle before another group of worktables can be set into rotation by the drive therefor.

A further object is to provide for stopping rotation automatically of a group of worktables when the milling cycle for the work pieces on such worktables is completed.

Another object is to provide such a machine in which an inactive group of cutter spindles when fed to profile milling relation with the worktables for such spindles during rotation and profile milling operations of another group of worktables and cutter spindles will automatically stop rotation of the latter worktables and the milling operations being performed thereon.

A further object is to prevent rotation of a group of worktables upon the feeding to operative milling positions of a group of cutter spindles other than the cutter spindles for milling operations on such worktables.

A further object is to so interlock the cutter spindles with the drives for the rotary worktables that the feeding of any two groups of cutter spindles to operative milling positions will prevent rotation of all worktables.

And a further general object is to provide a machine for carrying out the foregoing objects, functions and results at high rates of production with maximum efficiency and minimum maintenance over long periods of production and with the member of imperfect parts profile milled thereon reduced to a minimum.

With the foregoing as well as various other objects, features and results in view, my invention consists in certain novel features in design, arrangement and combination of parts and elements and in the design and construction of such parts and elements, all as will be more fully referred to and explained hereinafter.

Referring to the accompanying drawings in which similar reference characters refer to corresponding parts and elements throughout the several figures thereof:

Fig. 1 is a view in front elevation of a machine of my invention showing the sets of cutter spindles and the milling cutters thereon in raised inactive positions with the work clamping mechanisms on all of the worktables therebelow in their open, unclamped positions for work piece loading.

Fig. 2 is a view in elevation of the right-hand end of the machine of Fig. 1.

Fig. 3 is a view in top plan of the worktable assembly and rotary worktables thereon broken away at the central portion thereof with the hollow spindles of the innermost tables shown in horizontal section and the master cams and tracer carrying yoke member shown in top plan.

Fig. 4 is a view in vertical longitudinal section through the worktable assembly, saddle and supporting knee, taken in a vertical plane spaced forwardly of the rotary worktable, with the clamping mechanisms on such tables and the cutter heads and cutter spindles thereabove being shown in front elevation, the clamping mechanisms on the left-hand set of tables being shown in work clamping positions and on the right-hand set of tables being shown in unclamped, work-loading positions.

Fig. 5 is a vertical longitudinal section through the worktable assembly and rotary worktables thereon taken therethrough rearwardly of the section of Fig. 4 and diametrically through the rotary worktables with the work clamping mechanisms on such tables being shown in front elevation.

Fig. 6 is a horizontal section taken in a plane below the rotary worktables and through the hollow spindles thereof to show in top plan the independent powered drives for the rotary worktables.

Fig. 7 is a view in elevation of the left-hand end of the worktable assembly in mounted position on the saddle and supporting knee with the enclosing casing shown in vertical section to show the motor, clutch and portions of the rotary table drive transmission in elevation.

Fig. 8 is a vertical transverse section through the worktable assembly and a rotary worktable thereof taken as on the line 8—8 of Fig. 4, showing in side elevation the solenoid control valve unit and the cylinder and piston unit controlled thereby for operating the tracer spindle carrying yoke member.

Fig. 9 is a vertical transverse section through the worktable assembly and its supporting saddle and knee taken as on the line 9—9 of Fig. 8, showing the worktable assembly biasing unit in vertical longitudinal section.

Fig. 10 is a detail fragmentary view partially in vertical section and partially in elevation showing the tracer spindle carrying yoke member and its mounting on the saddle structure together with the actuating linkage therefor connecting the pressure fluid operated cylinder piston unit with the yoke member.

Fig. 11 is a detail fragmentary view showing one of the rotary table cycle controlling switches and its actuating mechanism for operation by a master cam mounted pin member.

Fig. 12 is a view in front elevation of the machine of Fig. 1, portions only of the cutter heads and cutter spindles and of the supporting knee being shown, with portions of the front casing wall of the machine being broken away to show in elevation the pressure fluid operating valves and the interlock switches actuated thereby for independently controlling the operation of the work clamping mechanisms of the groups of rotary worktables, respectively.

Figure 13:
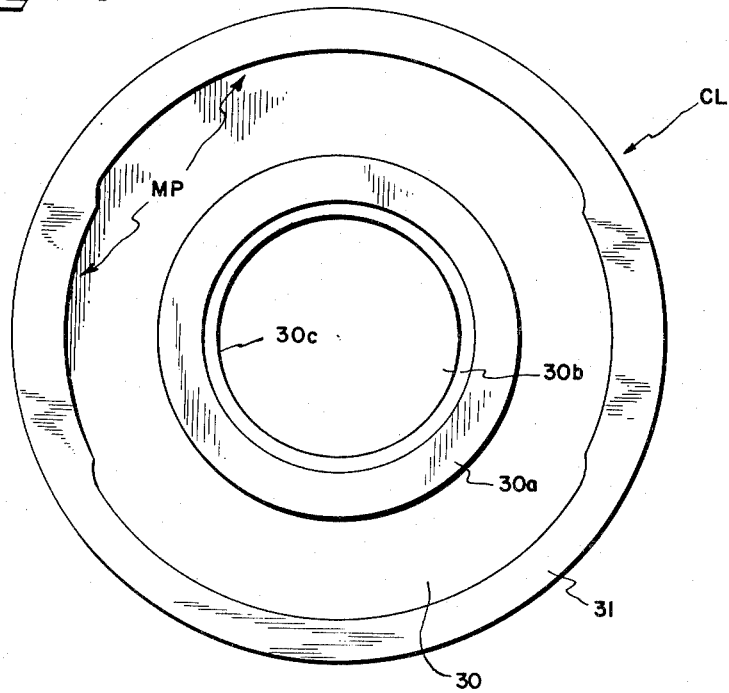

Fig. 13 is a view in bottom plan of one of the master cams of the example machine of Fig. 1.

Figure 14:
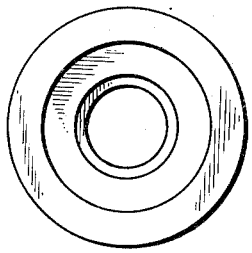

Fig. 14 is a plan view of a blank constituting the particular work piece for which the example machine is set-up to profile mill from a master cam.

Figure 15:
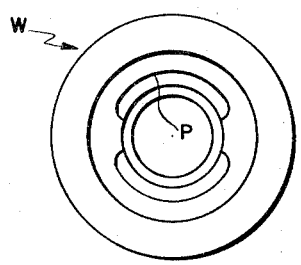

Fig. 15 is a plan view of the work piece blank of Fig. 14 in finished profile milled form.

Fig. 16 is a schematic wiring diagram of the power circuits for the machine of Fig. 1.

Fig. 17 is a schematic view of the control circuit network connected with the power circuits of Fig. 16.

One form and embodiment of a machine of the invention has been selected and is disclosed herein primarily as an example and not in all respects by way of limitation. This example machine is of a multiple, vertical spindle type having four (4) cutter spindles with four (4) rotary worktables mounted below said cutter spindles for the mounting thereon of work pieces and the rotation of such work pieces in profile milling relation with suitable milling cutters on the cutter spindles. In accordance with my invention the cutter spindles are mounted in positions fixed against lateral or radial movements while the rotary worktables therebelow are mounted and arranged for displacement simultaneously and bodily as a unit in either direction along straight line, parallel paths in or out or crosswise relative to the machine and to the rotary cutter spindles mounted thereabove. The straight-line cross-movements of the worktables are controlled by and under the dictation of master cams providing master profiles which are to be precisely reproduced on the table mounted work pieces, so that such profile reproduction is effected by the compound movements given to each work piece through the rotation of that work piece by and with its worktable about a vertical axis and the cross-movement of the work piece laterally or radially along the straight-line path relative to the cutter spindle and milling cutter operating thereon.

With the multiple cutter spindle and worktable type of machine of the example, the four (4) cutter spindles are arranged and adapted for operation in pairs or groups thereof in the cycling of the machine, that is, when one pair or group of cutter spindles is in operative profile milling position relative to the worktables therebelow, the other pair or group of cutter spindles is in an inactive position raised above their worktables for the loading and clamping of work pieces on such worktables during the profile milling cycle of the other pair of cutter spindles.

A machine of the invention, say as expressed in the example machine here disclosed, is semi-automatic in operation in that the conditioning of any set or group of cutter spindles and rotary worktables for profile milling operations therewith is effected by the manual operation of the cutter spindles to operative milling positions and by manually loading and then clamping the work pieces on the other and inactive group or set of rotary worktables, such clamping of the work pieces on the worktables being effected through manual control of the work piece clamping mechanism. However, the actual profile milling operation by the machine with any set or group of cutter spindles and rotary worktables is a fully automatic cycle, once initiated by manual operation of a starting switch, and the machine proceeds to completion of the milling cycle whereupon the rotation of the worktables and the master cam controlled cross-movements of such tables is stopped by the machine automatically for unclamping and unloading of the milled work pieces.

A machine of the invention, such as the example machine hereof, is primarily intended for the external or internal profile milling of various parts and components to form and provide thereon an annular profiled surface or surfaces in precise scaled reproduction of a master profile on a master cam which provides an operating component of the machine but which is removable and interchangeable with other master cams having thereon master profiles for the particular part to be milled.

While the example machine is shown as including four (4) cutter spindles and four (4) rotary worktables associated therewith it is to be understood that the invention is in no sense limited to such number of cutter spindles or in fact as to certain features and combinations thereof to multiple cutter spindles, as such features and the subcombinations for carrying them out will be found to have utility in a single spindle machine with a rotary worktable which is controlled by and from a master profile cam in accordance with the invention. Similarly, it is to be noted that while the example machine provides for automatic profile milling of each pair or group of the multiple spindles while the other pair or group is in inactive position for worktable loading, the invention contemplates and includes simultaneous profile milling operations of all of the cutter spindles where it may be desired to simultaneously profile mill with all work spindles with the loading of all worktables at the same time following such milling operations simultaneously by all cutter spindles.

The combinations, relationship and functioning presented by the basic combination of the invention as expressed in the example machine, are not limited or restricted to machines having vertical spindles and horizontal worktables rotatable about vertical axes beneath such cutter spindles, as this combination of components may be expressed and embodied in machine organizations in which such components have other positional relationships to the vertical and to the horizontal. The invention and the basic combinations and relationships thereof are expressed in the example as incorporated in a machine of the vertical column and knee type but the invention is not limited or restricted to machines having such types of supporting and mounting structure but may be readily embodied in operative expression in machines having any desired type of mounting and supporting frame structure for the various components, structures and mechanisms making up an organization embodying the invention.

GENERAL ORGANIZATION

The example machine, referring now to the drawings, is of the vertical column and knee type and includes the horizontal base 1 having the vertical column 2 extending upwardly from the rear portion thereof, with the vertically adjustable knee 3 located at the forward side of the column supported from the base 1 by the conventional or any desired arrangement of elevate screw 4. The knee 3 has the usual vertical sliding engagement on and with a vertical slideway 5 on the forward or front vertical side of the column 2. A ram structure R is mounted in horizontally disposed position extending on and across the upper end of the column 2. This ram R is of substantial width relative to the column 2 and extends forwardly from the column to form the wide head structure 6 providing the vertically disposed cutter heads 7, 8, 9 and 10 spaced apart thereacross in parallel relation in positions located above the knee 3. Within the cutter heads 7, 8, 9 and 10 there are mounted for vertical displacement therein between raised, inactive positions and lowered, operative positions, the rotary cutter spindle assemblies 7a, 8a, 9a and 10a having journaled therein the vertical cutter spindles 7S, 8S, 9S and 10S.

The ram structure R mounts at the rear portion thereof opposite the head 6 the laterally spaced motors 11 and 12, these motors being in this instance mounted and positioned with their drive shafts vertically disposed on axes substantially parallel with the vertical axes of the cutter spindles. The motor 11 at the left-hand side of the ram R is positioned back of and opposite the left-hand pair of cutter heads 7 and 8 while the motor 12 at the right-hand side of the ram is similarly located and positioned relative to the right-hand cutter heads 9 and 10. Suitable drives are provided between the motors 11 and 12 and the respective pairs of cutter spindles which are to be driven by such motors, as will be referred to an explained hereinafter. The cutter spindles 7S and 8S in the spindle assemblies at the left-hand side of the ram head 6 are adapted to be driven from the motor 11 completely independently of the cutter spindles 9S and 10S at the right-hand side of the ram head, such latter cutter spindles being driven independently of the spindles 7S and 8S by the motor 12 at the right-hand side of the ram.

The cutter spindle assemblies 7a and 8a in the cutter heads 7 and 8 at the left-hand side of the ram head 6 are adapted to be vertically displaced simultaneously as a unit between raised and inactive positions and lowered operative work cutting positions by a manually operable feed mechanism, and the cutter spindle aseemblies 9a and 10a at the right-hand side of the ram head 6 are similarly adapted for vertical displacement between inactive and operative positions by a manually operable feed mechanism which is independent of the feed mechanism for the cutter spindle assemblies 7a and 8a. Such independent feed mechanisms for the sets or groups of cutter spindle assemblies and cutter spindles journaled therein will be described and their functioning explained hereinafter.

A saddlle structure S is mounted in horizontally disposed position on and extending across the upper side of the knee 3 and is vertically adjustable with the latter as a unit. The saddle structure S is mounted on the knee 3 for horizontal adjustments independently thereof for cross displacement in and out relative to the column 2 and the head 6 of ram R, being constrained in such displacements to a straight-line path. A worktable assembly 20 is mounted and slidably supported on the saddle structure S for straight-line cross-movements thereon in and out relative to the machine, that is toward and from column 2 at the forward side of which such worktable assembly is located. The worktable assembly 20 includes a plurality of rotary worktables 21, 22, 23 and 24 mounted thereon at the upper side thereof in horizontally disposed positions for rotation about vertical axes parallel with the vertical axes of the cutter spindles in the cutter heads 7, 8, 9 and 10 which are positioned above such rotary worktables. The rotary worktables 21, 22, 23 and 24 are located in positions at the upper side of the worktable assembly 20 below and in generally vertical alignment with the cutter spindle assemblies 7a, 8a, 9a and 10a, respectively, reading from left to right when facing the front of the machine, so that the cutter spindles 7S, 8S, 9S and 10S are in positions to perform milling operations on work pieces suitably clamped and secured on the worktables, as will be clear by reference to Fig. 1. The worktables 21 and 22 constituting the pair at the left-hand side of the machine below the left-hand pair of cutter spindles 7S and 8S, are adapted to be driven and rotated independently of the pair of worktables 23 and 24 at the right-hand side of the machine, with the latter worktables being adapted to be driven and rotated independently of the left-hand pair of tables 21 and 22. Independent and separate powered drive mechanisms which will be referred to and described in detail hereinafter, are provided for rotating the left-hand pair of worktables 21 and 22 and for rotating the right-hand pair of worktables 23 and 24.

The separate and independent powered drive mechanisms including the driving motors thereof, for the left-hand pair of worktables 21 and 22 and for the right-hand pair of worktables 23 and 24 are mounted on and carried by the worktable assembly 20, so that the worktables and the drives therefor are mounted in fixed locations on the worktable assembly and are movable with that assembly as a unit structure. The straight-line in and out or cross-movements of the worktable assembly 20 on the saddle structure S by which the straight-line movements in and out of the worktables 21, 22, 23 and 24 are effected relative to the cutter spindles 7S, 8S, 9S and 10S, is carried out in accordance with the invention through the medium of a pair of master cams CL and CR. The master cams CL and CR are mounted on the lower ends of the vertically disposed rotary spindles or shafts of the worktables 22 and 23 for rotation with such tables. The master cam CL is adapted to control and dictate the in and out or cross-movements of the worktable assembly 20 when the left-hand cutter spindles 7S and 8S are performing milling operations on work pieces mounted on the left-hand worktables 21 and 22, with the master cam CR then being inactive, while the master cam CR is adapted to control and dictate the in and out or cross-movements of the worktable assembly 20 when the right-hand pair of cutter spindles 9S and 10S is performing milling operations on work pieces on the right-hand pair of worktables 23 and 24. With the master cam CR controlling the cross-movements of the worktable assembly, the master cam CL is inactive.

The master cams CL and CR each provide thereon an annular master profile or cam surface therearound generated about the axis thereof as a center. A tracer spindle TL is provided for enegagement by the master profile surface of master cam CL and a similar tracer spindle TR is provided for engagement by the master profile or cam surface of the master cam CR. These tracer spindles TL and TR are mounted on and supported by the saddle structure S independently of the worktable assembly 20 so that that assembly with the master cams CL and CR is movable crosswise of the machine on the saddle structure relative to the tracer spindles TL and TR which are mounted on the latter structure. In this example embodiment of a machine of the invention, the tracer spindles TL and TR are mounted on a supporting yoke member 50 which in turn is mounted and supported in horizontally disposed position on the saddle structure S for rocking or swinging about a vertical axis in a horizontal plane normal to the vertical axes about which the master cams CL and CR are rotated by and with the worktables 22 and 23. The tracer spindles TL and TR are mounted at the forward ends of opposite arms provided by the yoke member 50 in vertically disposed positions with their axes parallel with the axes of rotation of the master cams, so that by rocking yoke member 50 to the right the tracer spindle TR will be moved into operative tracing and cam surface following engagement with the master profile of the master cam CR and simultaneously the tracing spindle TL will be swung through an arc to an inactive position spaced from and out of engagement with the master profile of the master cam CL. By swinging the yoke member 50 to the left the tracing spindle TR will be displaced to inactive position disengaged from the master profile of the master cam CR and the tracing spindle TL will be simultaneously swung rearwardly to position in operative tracing or profile cam surface following position engaged with the master profile of the master cam CL. Thus the tracer spindles TL and TR are adapted to be alternately placed in operative tracing engagement with the master profile of that one of the master cams CL and CR which is to control and dictate the in and out or cross-movements of the worktable assembly 20 and the rotary worktables thereon.

The worktable assembly 20 is spring loaded and constantly yieldingly biased in a direction toward the front of the machine by a biasing spring unit 60 to thereby maintain either the master cam CL in tracing engagement with the tracing spindle TL or the master cam CR in tracing engagement with the tracing spindle TR.

The selective operation of the tracer spindle carrying yoke member 50 is controlled by the feed mechanisms (to be hereinafter described) for the pairs or groups of cutter spindles 7S and 8S and 9S and 10S by an actuating mechanism controlled therefrom which includes a pressure fluid cylinder and piston unit 70. (See Figs. 8 and 10.) The piston and cylinder unit 70 for selectively rocking or swinging the tracer spindle yoke member 50 is selectively controlled through the medium of a solenoid operated pressure fluid control valve unit 71 (see Fig. 8), the electrical circuits for which are suitably interlocked with and controlled by the selective operation of the independent cutter spindle feed mechanisms so that when the left-hand group or pair of cutter spindles 7S and 8S is fed downwardly to operative milling position, the yoke member 50 is swung to the left or counterclockwise to engage tracer spindle TL with the master profile of the master cam CL, and when the right-hand group or pair of cutter spindles 9S and 10S is fed downwardly to operative milling position with the left-hand group of spindles 7S and 8S raised to inactive position, the pressure fluid actuated cylinder 70 will swing the yoke member 50 to the right or clockwise and engage the tracer spindle TR with the master profile of the master cam CR.

In the normal operation of the machine when one group or pair of cutter spindles is lowered and in operative position relative to the worktables therebelow for profile milling operations on work pieces on such tables, the master cam for controlling and dictating the in and out or cross-movements of the worktable assembly 20 for that group of worktables and cutter spindles is in operative engagement with its tracer spindle, while the other group of cutter spindles is in raised and active position and the master cam for that group is in inoperative position relative to its tracer spindle. Thus, the raised inactive group of cutter spindles permits of loading work pieces on to the worktables for that inactive group. Upon completion of the profile milling operations by one group of cutter spindles such spindles may be withdrawn to inactive position and the other group of cutter spindles for the loaded worktables then fed to operative position for profile milling the loaded work pieces, with the master cam associated with that group of cutter spindles and worktables being placed in operative engagement with its tracer spindle. The machine thus precisely reproduces the annular master profile of a master cam in the form of an annular profile surface on the work piece by the master cam controlled in and out or cross-movements of the worktable assembly and the active work pieces thereon compounded with the rotation of the work pieces relative to the operating and rotating cutter spindles.

*Cutter spindles and drives and feeds therefor*

The left-hand pair or group of cutter spindles 7S and 8S is driven from the motor 11 on the ram R by a suitable endless belt 11a which is mounted on and which extends between and around a driving pulley on the lower end of the shaft of motor 11 and driven pulleys 11c on the upper ends of the cutter spindles 7S and 8S, as will be clear by reference to Figs. 1 and 2. Thus, the single motor 11 drives both of the left-hand cutter spindles 7S and 8S. The right-hand group or pair of cutter spindles 9S and 10S is driven in a similar manner from the motor 12 by means of a suitable endless belt 12a mounted around and extending between a driving pulley on the lower end of the shaft of motor 12 and the driven pulleys 12c mounted on the upper ends of the cutter spindles 9a and 10a. In this manner, the cutter spindles 9S and 10S are simultaneously rotated from the single motor 12.

In the machine of this example each rotary worktable mounts and carries thereon a pressure fluid actuated clamping mechanism and in order to maintain the center-to-center distances as small as possible between the worktables 21, 22, 23 and 24, by permitting what amounts to overlapping of the clamping structure mechanisms on the worktables, the worktables 22 and 24 are rotated counterclockwise, while the worktables 21 and 23 are rotated in the reverse direction, that is, clockwise. And further, as it is desired to perform conventional milling on the work pieces on the worktables 21, 22, 23 and 24, the cutter spindles 7S and 9S are rotated to the left, that is, counterclockwise, while the cutter spindles 8S and 10S are rotated to the right or clockwise, the rotation of the cutter spindles thus being in a direction opposite to the direction of rotation in which the work pieces being milled by such cutter spindles are rotated. For the purpose of overcoming or reducing vibration in the machine of the present example the group or pair of cutter spindles 9S and 10S at the right-hand side of the machine are rotated at a slightly higher rate of speed than the speed of rotation of the group or pair of cutter spindles 7S and 8S at the left-hand side of the machine.

An independent feed mechanism is provided for the left-hand pair of cutter spindle assemblies 7a and 8a by which said assemblies and the cutter spindles 7S and 8S journaled therein may be fed downwardly simultaneously to operating position relative to the worktables 21 and 22 therebelow and may be raised from operating position to inactive position spaced above such worktables for work loading clearance. The spindle assemblies 7a and 8a are each suitably spring loaded and continuously biased upwardly to their raised inactive positions. Such spindle feed mechanism is of the manually operable type and includes a feed shaft 14L journaled in suitable bearings in the head structure 6 in horizontally disposed position to the rear of and extending across the left-hand pair of cutter heads 7 and 8. This feed shaft 14L mounts at the outer end thereof the manual operating lever or handle member 15L. The cutter spindle assemblies 7a and 8a are provided on the rear sides thereof with the vertically disposed racks 15a and the feed shaft 14L mounts thereon the pinion gears 14a which are engaged and in mesh with the cutter spindle assembly carried racks 15a, respectively. The manual operating lever 15L is fixed on the outer end of the feed shaft 14L so that with the cutter spindle assemblies 7a and 8a in their raised inactive positions, the lever 15L is in position extending radially upwardly and forwardly from the shaft, as will be clear by reference to Fig. 1. Thus, by swinging the hand lever 15L downwardly the rotation of the pinions 14a with the feed shaft 14L will simultaneously feed the pair of cutter assemblies 7a and 8a downwardly against the spring biasing thereof to operative milling positions relative to the worktables 21 and 22 therebelow. The cutter spindle assemblies 7a and 8a with their cutter spindles 7S and 8S may be readily raised from operative to inactive positions by rocking or swinging the hand lever 15L upwardly to the position as shown in Fig. 1.

The group or pair of cutter spindle assemblies 9a and 10a and the cutter spindles 9S and 10S journaled therein located at the right-hand side of the machine is provided with a feed mechanism therefor which is identical with but independent of the feed mechanism above described with the right-hand pair of cutter spindle assemblies and cutter spindles. The spindle assemblies 9a and 10a are also each spring loaded and continuously biased upwardly to their raised inactive positions. The feed mechanism for the right-hand pair of cutter spindle assemblies 9a and 10a includes a feed shaft 14R which is suitably journaled in horizontally disposed position in the ram head 6 to extend across and to the rear of the right-hand pair of cutter heads 9 and 10. This shaft 14R at the outer end thereof has fixed thereon the operating hand lever 15R. Racks 15a are provided in vertically disposed positions on the rear sides of the cutter spindle assemblies 9a and 10a which racks are engaged by and in mesh with the pinions 14b fixed on the feed shaft 14R. Thus, the cutter spindle assemblies 9a and 10a and the cutter spindles 9S and 10S journaled therein may be fed downwardly from their raised inactive positions against the spring biasing thereof to operative milling positions relative to the worktables 23 and 24 therebelow by swinging the hand lever 15R downwardly, and may be raised from such operative positions to inactive positions by swinging the lever 15R upwardly to position extending radially upwardly and forwardly from the feed shaft 14R.

As will be explained hereinafter, the tracer spindle mounting yoke member 50 which is operated by the pressure fluid actuated cylinder and piston unit 70, is selectively controlled from the cutter spindle feed mechanisms for the groups or pairs of cutter spindles 7S and 8S, and 9S and 10S. Such selective control of the operation of the tracer spindle yoke member 50 is through suitable electrical circuits, to be later described, for the solenoid operated pressure fluid controlling valve unit 71. In carrying out the selective control of such electrical circuits a micro switch 16 is mounted on the left-hand end of the head 6 of ram R adjacent the outer end of the feed shaft 14L and a similar micro switch 17 is mounted on the right-hand end of the head 6 adjacent the outer end of the feed shaft 14R for the right-hand pair of cutter spindles 9S and 10S. The micro switch 16 is provided with a forwardly extending actuating pin 16a while the right-hand micro switch 17 is provided with a similar forwardly extending actuating pin or plunger 17a. A cam member 18L is mounted in fixed position on the outer end of feed shaft 14L at the inner side of the hand lever 15L and is formed so as to engage and force the actuating plunger 16a of the left-hand switch 16 inwardly to close the contacts in that switch and the circuit therethrough when the hand lever 15L is swung downwardly from inactive position to position with the left-hand pair of cutter spindles 7S and 8S lowered to operative milling positions. When the lever 15L is swung upwardly to inactive position the cam 18L releases or disengages switch actuating plunger 16a to effect opening of the switch contacts and the circuit therethrough. A similar cam member 18R is mounted on the outer end of the feed shaft 14R for the right-hand pair of cutter spindles 9S and 10S and this cam is formed to engage the actuating plunger 17a of the right-hand switch 17 and force that plunger to switch and circuit closing position when the hand lever 15R is swung downwardly to feed the right-hand pair of cutter spindles 9S and 10S to operative milling positions. When the hand lever 15R is swung upwardly to position with the cutter spindles raised to inactive positions, the cam 18R releases the actuating plunger 17a of the switch 17 so that the contacts and the circuit therethrough are opened.

*The saddle structure*

The saddle structure S which is slidably adjustably mounted on the knee 3 and which mounts the worktable assembly 20 for cross-movements thereon under the control and dictation of either the master cam CL or the master cam CR, is comprised in this example by a plate-like body or base 19 having the opposite laterally extended and horizontally disposed wings providing the platforms 19a which are elevated or in a plane spaced above the plane of the top surface of the body 19. The laterally extended elevated wings 19a of the saddle body 19 are provided at their outer sides with the upwardly extending edge flanges or rails 19b therealong. The underside of the body 19 is provided with a dovetail slideway 19c therein which slidably receives the dovetail slide 19d which is formed in the usual manner familiar in the art, on the upper side of the knee 3 disposed longitudinally thereof, that is, in and out relative to the machine. In this manner the saddle structure S with the worktable assembly 20 mounted thereon is adjustable on and relative to the knee 3 in or out or crosswise of the machine for a purpose to be referred to hereinafter. The knee 3 mounts thereon below the dovetail slide 19d the usual rotary cross feed screw 3a which extends longitudinally therealong and which threadedly engages structure of saddle S or a member such as the usual cross feed nut 3b fixed on the saddle, so that rotation of the feed screw 3a in the proper direction will effect displacement inwardly or outwardly of the saddle and the worktable assembly 20 which it carries, in or out relative to the machine and to the cutter spindles 7S, 8S, 9S and 10S which are mounted on the head of the machine in position above the worktable assembly (see Fig. 9). The outer end of the feed screw 3a may have mounted thereon the usual or any desired micrometer dial member 3c by which adjustments of the saddle in or out on the knee 3 may be micrometer measured.

Vertical adjustments upwardly and downwardly of the saddle S and the worktable assembly 20 are effected by vertical adjustments of the knee 3 on the base 1 and column 2 through the medium of the operating shaft 3d.

for selectively rotating in the desired direction the elevate screw 4 in the usual manner familiar in this art.

The worktable assembly

The worktable assembly 20 which is mounted on the saddle S for cross-movements thereon, includes a frame structure 20F mounted on the upper side of the saddle structures S on anti-friction ball tracks or ways on the upper sides of the opposite wings or platforms 19a of the saddle body 19. These anti-friction ball tracks or slides comprise a bar or track member 20a mounted along the upper side of each of the wings 19a in position disposed thereacross from front to rear parallel with the straight-line path of crosswise movement of the saddle S on the knee 3, with each of these saddle carried track bars having at the inner side thereof disposed longitudinally therealong the ball raceway 20b. The opposite sides of the central portion of the frame structure 20F which is positioned above the saddle body 19 are provided along the outer sides thereof with the horizontal track bars 20c, respectively. Each track bar 20c has the horizontal ball raceway 20d in and extending longitudinally along the outer vertical side thereof. The track bars 20c on the frame structure 20F are positioned by the frame structure opposite and facing the track bars 20a, respectively, on the saddle body 19 with the ball raceways 20b and 20c on each pair or set of track bars receiving therebetween the series of anti-friction balls 20e having rolling engagement in the facing raceways 20b and 20d of such pair of bars. Thus the frame structure 20F which forms a part of and which mounts and carries the worktable assembly 20, is mounted at opposite sides thereof on the parallel, straight-line sets of balls 20e in the respective pairs of opposite side track bars 20a and 20c for free-rolling, minimum friction cross-movements bodily with the worktable assembly on and independently of the saddle S.

The rotary worktables 21, 22, 23 and 24 are mounted in horizontally disposed position at and spaced apart along the upper side of the frame structure 20F, being journaled on that frame structure for rotation about vertical, parallel axes. Referring now to Figs. 4 and 5 of the drawings in particular, the worktable 21 at the outer end of the left-hand side of the worktable assembly 20 is mounted on and fixed to a hollow spindle or shaft 21a which is journaled in suitable vertically spaced annular roller bearing assemblies 21b and 21c of the radial-thrust type mounted in adjacent portions of the frame structure 20F with the table 21 having the depending peripheral flange 21d therearound surrounding an annular ring structure 21e which forms a carrier or mounting for the upper bearing assembly 21b and which is suitably fixed in position on the frame structure 20F. The basic structure of the rotary table 21 thus provides in this example a planar flat upper or top surface for mounting thereon the work clamping mechanism, as will be referred to hereinafter.

Intermediate the upper bearing assembly 21b and the lower bearing assembly 21c, the hollow spindle or shaft 21a of the worktable 21 provides thereon the worm wheel 21f concentric therewith, which worm wheel may, as in the example hereof, be formed integral with and as a part of the shaft or spindle 21a. Worm wheel 21f provides the driving gear for rotating the spindle 21a and the worktable 21 fixed thereon.

The worktable 22 of the left-hand pair of worktables is mounted on the frame structure 20F in position immediately adjacent the worktable 21 at the inner side thereof. The worktable 22 is mounted on and fixed to the upper end of a hollow spindle or shaft 22a which is journaled in suitable vertically spaced upper and lower, annular roller bearing assemblies 22b and 22c of the combined radial and thrust type. The bearing assemblies 22b and 22c are mounted and fixed in position on adjacent portions of the frame structure 20F with the table 22 having the depending peripheral flange 22d therearound surrounding an annular ring structure 22e which forms a carrier or mounting for the upper bearing assembly 22b and which is suitably fixed in position on the frame structure 20F. The basic structure of the rotary table 22 provides a planar flat upper or top surface which, in this example, lies in the same plane as the plane of the top surface of table 21. The table 22 is adapted to have mounted and positioned thereon suitable work clamping mechanism for rotation with the table. In this instance the hollow shaft or spindle 22a which mounts and journals the table 22 is of greater length than the spindle or shaft 21a of the table 22 and extends into the frame structure 20F a distance below the lower bearing 22c. The depending lower end portion of the spindle 22a is adapted to mount thereon for rotation therewith the master cam CL.

A worm wheel 22f is provided on and concentric with spindle 22a intermediate the upper and lower bearing assemblies 22b and 22c, this worm wheel 22f being positioned to lie in the horizontal plane of the worm wheel 21f on spindle 21a of worktable 21. This worm wheel 22f provides the driving gear for rotating the spindle 22a and the worktable 22 fixed thereon. If desired, as in the example hereof, the worm wheel 22f may be formed integral with and as a part of the spindle 22a.

The worktable 24 at the outer end of the right-hand side of the worktable assembly 20 is mounted on and fixed to a hollow spindle or shaft 24a which is journaled in suitable vertically spaced annular, radial-thrust type roller bearing assemblies 24b and 24c mounted in adjacent portions of the frame structure 20F with the table 24 having the depending peripheral flange 24d therearound surrounding an annular ring structure 24e which forms a carrier or mounting for the upper bearing assembly 24b and which is suitably fixed in position on the frame structure 20F. The lower bearing assembly 24c is mounted in a suitable mounting or carrier ring structure provided by a portion of the frame structure 20F. The basic structure of the rotary table 24 is identical with the structures of the left-hand pair of tables 21 and 22 and provides a planar flat upper or top surface for mounting thereon a suitable work clamping mechanism for rotation as a unit with the worktable. The worktable 24 is positioned with its top surface in the horizontal plane of the top surfaces of worktables 21 and 22.

A worm wheel 24f is provided on the spindle or shaft 24a in position concentric therewith and located between the upper and lower bearing assemblies 24b and 24c. The worm wheel 24f is positioned on the spindle 24a to lie in the horizontal plane of the worm wheels 21f and 22f of the worktables 21 and 22 and, if desired, may be formed integral with the shaft or spindle 24a of the worktable 24. This worm wheel 24f provides the driving component or gear for rotating the spindle 24a and the worktable 24 fixed thereon.

Immediately adjacent the worktable 24 at the inner side thereof on the frame structure 20F, the inner worktable 23 of the right-hand pair of worktables is mounted and positioned on and fixed to a hollow spindle or shaft 23a. This shaft 23a is journaled in suitable vertically spaced upper and lower annular roller bearing assemblies 23b and 23c of the combined radial-thrust type mounted in adjacent portions of the frame structure 20F. The worktable 23 has the depending peripheral flange 23d therearound surrounding an annular ring structure 23e which forms a carrier or mounting for the upper bearing assembly 23b and which is suitably fixed in position on the frame structure 20F. The basic structure of the rotary worktable 23 is identical with the worktable 24 and the worktables 21 and 22, and provides a horizontal planar upper or top surface for mounting thereon a suitable work clamping mechanism (referred to and described hereinafter), such top surface being in the horizontal plane of the top surfaces of worktables 21, 22 and 24.

Intermediate the upper bearing assembly 23b and the lower bearing assembly 23c, the hollow spindle or shaft 23a of the worktable 23 is provided with a worm wheel 23f concentric therewith and lying in the same horizontal plane as the worm wheels 21f, 22f and 24f of the worktables 21, 22 and 24. The worm wheel 23f forms the driving component or gear for rotating the spindle 23a and the worktable 23 fixed thereon and may, if desired, be formed as an integral part of the shaft or spindle, as shown in the example hereof.

*Independent powered drives for the separate groups of worktables*

A powered drive mechanism is provided for simultaneously rotating the left-hand group or pair of worktables 21 and 22, such drive mechanism being powered by a motor 25L mounted in position hung or suspended from the underside of the left-hand end of the worktable assembly frame structure 20F by a suitable bracket or hanger structure 25a. The motor 25L is mounted with its driving shaft vertically disposed and has the upper end thereof suitably coupled in driving relation through a gear set 25b to a horizontally disposed power take-off shaft 25c from the gear set, shaft 25c being extended outwardly from the outer side of the gear set. Mounted on and in operative association with the power take-off shaft 25c, there is provided an electro-magnetic clutch component 26L for clutching and engaging the power shaft 25c with a driving pulley unit 26a of the V-belt type mounted on shaft 25c, and for declutching and disengaging shaft 25c from the driving pulley unit 26a. This magnetic clutch component 26L may be of any well-known or desired type and the detailed construction thereof being no part of my present invention it is not considered necessary to specifically describe such clutch as to the various components and the detail functioning thereof. Suffice it to state that when the clutch component 26L is energized by the closing of a power circuit thereto, the clutch is actuated to engaged position to place power shaft 25c in driving connection with pulley unit 26a and when the clutch is deenergized by opening such power circuit, it is actuated to and assumes declutched position disengaging power shaft 25c from the pulley 26a. The power circuit of the electro-magnetic clutch component 26 is under the control of the operator of the machine, as will be described and explained hereinafter.

A drive shaft 27 (referring particularly to Fig. 6) is journaled in horizontally disposed position along the rear side of the group or pair of right-hand worktables 21 and 22 in suitable bearing assemblies 27a and 27b mounted in the frame structure 20F. The bearing assembly 27a for the shaft 27 is mounted in the left-hand end of the frame structure 20F and journals therein the outer end length of the shaft 27. The bearing assembly 27b mounts and journals therein the inner end of the shaft 27, this bearing assembly 27b being mounted in a boss or carrier ring 27c at the left-hand side of a central portion of the frame structure 20F, as will be clear by reference to Fig. 6. The drive shaft 27 is positioned with its axis in the horizontal plane of the worm wheels 21f and 22f on the spindles 21a and 22a of the worktables 21 and 22 and is provided with the worms 27d and 27e for driving engagement with the worm wheels 21f and 22f, respectively. The shaft 27 is adapted to be driven in right-hand rotation, that is, counterclockwise when facing the end of the shaft at the left-hand side of the worktable assembly 20. With such direction of rotation of the shaft 27 the worm 27d is a right-hand worm to thereby rotate the worktable 21 clockwise while the worm 27e is a left-hand worm to thereby rotate the worktable 22 counterclockwise.

The shaft assembly 27 extends outwardly beyond the bearing assembly 27a and mounts thereon a driven pulley 27f of the V-belt type which is in position thereon opposite and in alignment with the pulley 26a of the power shaft 25c. The pulley 27f is of greater diameter in this instance than the driven pulley 26a and is driven from and by the pulley 26a by a suitable V-belt 27g mounted on and extending between the pulleys. Thus, powered rotation of pulley 26a from the motor 25L through the clutch component 26L will rotate pulley 27f and through the drive shaft 27 and worms 27d and 27e in driving engagement with the worm wheels 21f and 22f will effect simultaneous rotation of the group or pair of worktables 21 and 22 in opposite directions but at the same rates of speed of rotation.

A powered drive mechanism is provided for simultaneously rotating the right-hand group or pair of worktables 23 and 24, such drive mechanism being completely separate from and independent of the drive mechanism for the left-hand group or pair of worktables 21 and 22. The drive mechanism for the right-hand pair of worktables 23 and 24 is in all substantial respects identical with the drive mechanism for the left-hand pair of tables 21 and 22, and includes the motor 25R mounted in position hung or suspended from the underside of the right-hand end of the worktable assembly structure 20F by a suitable bracket structure 25a. The motor 25R is identical with the motor 25L and is mounted with its driving shaft vertically disposed. The upper end of the driving shaft of motor 25R is suitably coupled in driving relation through a gear set 25b identical with such component as described in connection with the drive mechanism for the left-hand tables 21 and 22. The gear set includes the power take-off shaft 25c on which there is mounted in operative association therewith an electromagnetic clutch component 26R similar to the clutch component 26L of the left-hand drive, by which the power shaft 25c may be clutched and engaged with and declutched and disengaged from the driving pulley unit 26a mounted on the shaft 25c. This magnetic clutch component 26L is operated through a power circuit thereto under the control of the operator of the machine, as will be hereinafter described.

A drive shaft 28, referring now to Fig. 6 in particular, is journaled in horizontally disposed position along the rear side of the group or pair of right-hand worktables 23 and 24 in suitable inner and outer bearing assemblies 28a and 28b mounted in the frame structure 20F. The outer bearing assembly 28a for the shaft 28 is mounted in the right-hand end of the frame structure 20F and receives and journals therein the outer end length of the shaft 28. The inner bearing assembly 28b mounts and journals therein the inner end of the shaft 28. Bearing assembly 28b is mounted in the boss or carrier ring 27c at the right-hand side of a central portion of the frame structure 20F. The drive shaft 28 is positioned in axial alignment with the drive shaft 27, that is, in the horizontal plane of the worm wheels 23f and 24f on the spindles 23a and 24a of the right-hand worktables 23 and 24. This drive shaft 28 is provided with the worms 28d and 28e for driving engagement with the worm wheels 23f and 24f, respectively. The shaft 28 is adapted to be driven from the motor 25R in right-hand rotation, that is, counterclockwise when facing the right-hand end of the worktable assembly 20. With such direction of rotation of the shaft 20a the worm 28d is a right-hand worm to thereby rotate the worktable 23 clockwise while the worm 28e is a left-hand worm to thereby simultaneously rotate the worktable 24 counterclockwise.

The shaft assembly 28 extends outwardly beyond the bearing assembly 28a and mounts thereon a driven pulley 28f of the V-belt type. Pulley 28f is in position on shaft 28 opposite and in alignment with the pulley unit 26a of the power shaft 25c. In this example the pulley 28f is of greater diameter than the driven pulley 26a and is driven from and by the pulley 26a by a suitable V-belt 28g. The rotation of pulley 26a from the motor 25R through the clutch component 26R will rotate pulley 28f and through the drive shaft 28 and worms 28d and 28e which are in driving engagement with the worm wheels 23f and 24f will simultaneously rotate the pair of worktables 21 and 22 at the same rate of speed but in opposite directions, that is, to rotate table 23 clockwise and table 24 counterclockwise.

The table assembly 20 thus includes the frame structure 20F, the left-hand pair of rotary worktables 21 and 22 with the drive mechanism therefor including the motor 25L and the electromagnetic clutch 26L, and the right-hand pair of rotary worktables 23 and 24 and the drive mechanism therefor, including the motor 25R and the electro-magnetic clutch 26R. The rotary worktables and the drives therefor, including the motors and the clutches, are all mounted and supported on the frame structure 20F so that this entire assemblage 20 is bodily movable as a unit structure crosswise of the machine on and independently of the saddle S on the anti-friction ball slides 20a—20c—20e located on the elevated platforms provided by the opposite side wing portions 19a of the saddle 19. With the pairs of rotary worktables 21 and 22, and 23 and 24, and the independent drive mechanisms therefor, including the motors 25L and 25R, mounted on the frame structure 20F and making up therewith the worktable and driving assembly 20, the independent drives are operable and the tables are rotatable thereby during and in all positions of cross-movements in and out of the assembly 20 on and relative to the saddle S. In such cross-movements of the assembly 20 the rotating worktables 21, 22, 23 and 24 are thus not only rotated relative to the cutter spindles 7S, 8S, 9S and 10S thereabove, but are also bodily moved along straight-line paths relative to such cutter spindles so that work pieces on the worktables have resultant movements relative to the cutter spindles compounded of the rotary movement and the bodily movements thereof crosswise of the machine. The crosswise movements bodily of the worktable assembly 20 and the worktables thereon are controlled and dictated by and from master cams which are mounted on, carried with, and rotated by the spindles or shafts of the worktables 22 and 23 in operative relation with tracer spindles mounted on the saddle S.

*The master cams*

Following the teachings of my present invention for profile milling on internal or external work pieces in precise reproduction of a master or pattern profile, I provide for this particular example machine, a pair of master cams CL and CR which are mounted on the lower or inner ends of the spindles 22a and 23a, respectively, of the worktables 22 and 23 for selective operation to control and dictate the cross-movements of the worktable assembly 20 and the rotary worktables 21, 22, 23 and 24 mounted thereon.

The machine of the present example is shown as equipped and set up for profile milling an annular internal profile or cam surface P on and around a ring-like or annular form of work piece W as shown in Fig. 15. And as the same profile milling operations are to be performed on both the left-hand pair of worktables 21 and 22 and the right-hand pair of worktables 23 and 24, the master cams are, in this instance, identical. However, as will be hereinafter pointed out and explained, the machine may profile mill different profile surfaces on one pair of worktables from the profile surfaces to be milled on the other pair of worktables, in which event, of course, the master cams CL and CR will provide different master profiles accordingly and will be selectively placed in operation to effect crosswise movements of the worktable assembly 20 in accordance with the piece parts to be profile milled under the dictation thereof.

Referring now to Fig. 13 in which there is shown one of the master cams, say the master cam CL, the cam is comprised by an annular disc-like body 30 having extending from one side thereof a hub forming flange 30a surrounding the axial and circular opening 30b through the cam body with this hub flange being provided with a radially inwardly extending positioning rib 30c therearound. The master profile which is to control and dictate the scaled reproduction thereof in a work piece is provided as an annular master profile surface MP on or around the inner side of an annular rib or flange 31 which may be formed integral with the cam body 30 or which may be formed as a separate, singe-piece or multi-piece annular component suitably fixed on and to the inner or underside of the cam body 30 in true concentricity with and relative to the central bore or opening 30b in the cam body. The master cam or profile surface MP is a profile surface generated about the true center or axis of the master cam, that is, about the axis of rotation thereof.

The master cam CL is mounted on and fixed to the lower end of the hollow spindle 22a of the worktable 22 in position with the cam hub 30a and the profile or cam forming flange or ring 31 located at the underside of the master cam, by a series of radially disposed fastening members such as the threaded bolts 32 extending through the hub 30a into the spindle 22a. The master cam fastening members 32 are provided at spaced intervals around the hub of the cam, in this instance six (6) of such fastening members being employed. The worktable spindle 22a is provided with an annular groove therearound which receives the positioning rib 30c of the master cam hub when the master cam is in mounted position on the worktable spindle. The master cam CL thus mounted is attached and fixed to the worktable spindle 22a and is positioned at a distance spaced below the lower bearing 30b for the spindle 22a, as will be clear by reference to Fig. 5. The master cam CR is identical in construction with master cam CL and is similarly mounted and positioned on the lower end of the hollow spindle 23a of the worktable 23 by the attaching members or screws 32 for rotation by and with worktable 23 and its spindle 23a. The master cams CL and CR are mounted on their respective spindles 22a and 23a in posiitons located in the same horizontal plane.

Referring to Fig. 11, the master cam CL mounts a vertically disposed switch actuating pin 33 in the profile cam forming annular flange or ring 31 in position depending from the underside thereof with a suitable anti-friction roller 34 mounted on the depending portion of the pin. The pin and roller 33—34 are mounted in a position with their aligned axes parallel with the axis of rotation of the master cam for the purpose of actuating a microswitch which controls the clutch unit 26L of the drive mechanism for the left-hand pair of worktables 21 and 22. The actuating of such controlling switch by the pin and roller 33—34 is for the purpose of stopping rotation of the worktables 21 and 22 upon completion of one revolution thereof constituting the profile milling cycle for the work pieces on such tables in the operation of the example machine. Such controlling switch and the specific operation thereof and of the circuit controlled thereby will be hereinafter explained.

A pin 33 and roller 34 are also provided on the master cam CR and are in all respects similar in structure and in location to the pin and roller 33—34 of master cam CL. The pin and roller 33—34 on the master cam CR are for the purpose of operating a cycle switch controlling the drive for the right-hand pair of worktables 23 and 24, as will be hereinafter described.

*Biasing the worktable assembly*

As referred to hereinbefore, the worktable assembly 20, as a unit structure, is spring loaded and continuously biased toward the front of the worktable assembly, that is, the front of the machine. In this specific example, referring now to Fig. 9, the biasing unit 60 for the worktable assembly includes a horizontally disposed, tubular casing or housing 61 which may be formed as a part of the frame structure 20F and which extends from the forward end thereof located at the front side of the worktable assembly inwardly of that frame structure at a central location in a position between but below the master cams CL and CR. Within this casing 61 there is provided a coil spring 62 which is engaged under compression at its inner and outer ends between an abutment bracket 63 which is fixed to the saddle S at a location spaced a distance inwardly from the inner end of the casing 61 on the worktable assembly, and an adjustable abutment plate 64 positioned in the casing 61 adjacent the forward end thereof. The abutment plate 64 is carried by a threaded stem 65 which is threaded through a sleeve 66 fixed on the forward or front end of the casing 61 with the stem extending outwardly beyond the sleeve 66 and having flats on the outer end thereof for engagement by an adjusting tool for rotating the stem to thereby displace the abutment plate 64 inwardly or outwardly to increase or decrease the compression of the biasing spring 62. Thus, with the inner spring abutment plate 63 fixed to the saddle S which is normally fixed against cross-movement on the knee 3, the expansion forces of the compressed spring 62 continuously act to bias or force the entire worktable assembly forwardly toward the front of the machine on and independently of the saddle S. If, therefore, the worktable assembly 20 is unconstrained, it will be maintained by this biasing spring unit 60 at its position of maximum forward displacement on saddle S.

*The tracers for the master cams*

The cross-movements of the worktable assembly 20 and the worktables 21, 22, 23 and 24 thereon are precision controlled and dictated by rotating a master cam with its master profile or cam surface MP in engagement against and, in effect, following a fixed position tracing spindle or stylus so that rises on the master profile or cam surface between a low and a high portion thereof will force cross-movement of the worktable assembly and worktables rearwardly on the saddle S while the spring biasing of the worktable assembly by the unit 60 will cause the cross-movements of the worktable assembly in the forward direction as the rises from the high to the low portions of the master profile surface are rotated past and in engagement with the tracing spindle.

In this example the tracing spindle TL is provided for selective, fixed position operative engagement with the master profile MP of the master cam CL, and the tracing spindle TR is provided for selective, fixed position engagement with the master profile MP of the master cam CR. The mounting and carrying arrangement for the tracing spindles TL and TR is such that the tracing spindles are alternately engaged with their respective rotary master cams, so that when one tracing spindle is in fixed position in operative engagement with its rotating master cam, the other tracing spindle is in an inactive position disengaged from tracing or cam following engagement with its master cam. In carrying out such functioning in the present example machine, the tracer spindles TL and TR are mounted on a horizontally positioned yoke member 50 which is mounted on the saddle S for swinging in one direction or the other about a fixed, vertical axis on the saddle, with the tracing spindles being vertically disposed with their axes parallel with the axes of rotation of the master cams.

The yoke member 50 is mounted in horizontally disposed position for rocking or swinging in either direction in a horizontal plane about a vertical axis provided by a vertically mounted shaft 51. Referring to Fig. 10 in particular, the shaft 51 is mounted on the saddle S adjacent the rear side thereof with its axis in the vertical plane of the transverse center of the saddle S. The shaft or spindle 51 is journaled in such position in ball bearing assemblies 51a which are mounted in and carried by a bearing carrier sleeve 51b. The sleeve 51b is mounted in and extends downwardly through a suitable bore formed in the saddle with the lower end of the bearing carrier 51b extending a distance below the saddle into an opening formed through the dovetail slide 5 on the upper side of the knee 3. The bearing carrier sleeve 51b is in this example suitably attached in fixed position on the saddle by the threaded bolts 51c. The yoke member 50 provides the base 52 which is secured to the upper end of the spindle or shaft 51, and the yoke arms 53L and 53R which extend in horizontally disposed positions diverging forwardly from the opposite ends of the base 52, as will be clear by reference to Fig. 3. The tracer spindle TL is mounted in fixed position on and extending upwardly from the arm 53L at the forward end thereof with its axis vertical and parallel with the vertical axis of rotation of the yoke spindle 51. Tracer spindle TL includes a suitable anti-friction roller thereon for rolling engagement with the master profile or cam surface MP of the master cam CL. The tracing spindle TR is in all respects similar to the tracing spindle TL but is mounted on the yoke arm 53R at the forward end of such arm in vertical position extending upwardly from the arm with its axis parallel with the axis of tracer spindle TL and the vertical axis of rotation of the yoke spindle 51. The tracing spindle TR preferably includes a suitable anti-friction roller mounted thereon for rolling engagement with and along the master profile MP of the master cam CR.

The mounting and the positioning of the tracer spindle carrying yoke 50 on the saddle S and the lengths of the arms 53L and 53R thereof relative to the master cams CL and CR, is such that the tracing spindles TL and TR are located at the undersides of the master cams CL in positions at the inner sides of the master profile surfaces MP for selective engagement of the tracer TL with the master profile surface MP of the master cam CL or the tracer TR with the profile surface MP of the master cam CR. Thus mounted, the tracer spindle carrying yoke 50 is horizontally rockable or swingable about the axis of spindle 51 to the right or to the left to engage tracer spindle 53R with the master profile surface MP of master cam CR, or to engage the tracer spindle TL with the master profile surface of the master cam CL.

The angle of divergence of the yoke arms 53L and 53R and the respective lengths of said arms relative to the axis of the yoke spindle 51 and the master cams CL and CR, is such that when the yoke 50 is swung to the right to engage the tracer spindle TR with the master profile surface MP of the master cam CR, the tracer spindle TR will engage the profile surface MP at a point on a diameter line drawn through the axis of rotation of cam CR parallel with the straight-line path of cross-movements of the worktable assembly 20. And similarly, when the yoke member 50 is swung or rocked to the left to disengage tracer spindle TR from the master profile surface MP of master cam CR, the tracer spindle TL is swung rearwardly to a fixed position engaged with the master profile surface MP of master cam CL at a point on a diameter line drawn through the axis of rotation of master cam CL and parallel with the straight-line path of cross-movements of the worktable assembly 20. In order to attain such points of engagement for the tracer spindles TL and TR of the present example, the length of the yoke arm 53L is slightly greater than the length of the yoke arm 53R, as will be clear by reference to Fig. 3.

In order to adjustably limit the swinging or rocking movements of the yoke member 50 to the right or to the left to thereby accurately position either tracer spindle in master profile engaging and following position, an adjustable stop or limit screw 54R is mounted in horizontally disposed forwardly extending position at the rear of the yoke member 50 adjacent the right-hand end of the yoke body 52 for engagement by a stop member 55R carried by the yoke member to thereby limit rearward movement of the yoke arm 53R and tracer spindle TR when the latter is swung to master profile engaging position by swinging of the yoke member 50 to the right. A similar stop or limit screw 54L is mounted to the rear of the left-hand end of the yoke body 51 for engagement by an abutment member 55L mounted on and swingable with the yoke member 50 to limit rearward swinging of the yoke arm 53L and tracer TL when the yoke member is swung to the left to engage the tracer spindle TL with the master profile of the master cam CL.

In the example automatic duplicator machine embodiment of the invention, the profile surface WP is milled on the work piece W from the master profile MP of the master cam CL or the master cam CR at a basic reproduction ratio of 1:1, but by substantially enlarging the diameters of the master cams over the diameters of the profile milled surface WP of a work piece, a principle of reduction on a degree basis is obtained. It will be noted by reference to Figs. 13 and 15 that the slow rises and falls on a master profile MP are reproduced on the work piece as fast rises and falls of the surface WP profile milled on the work piece.

*The operating mechanism for the tracer spindle carrying yoke member*

The yoke member 50 is selectively operated under the control of the selective operation of the down feed mechanisms for the groups of cutter spindles, respectively, to either engage tracer spindle TL with master cam CL, or engage tracer spindle TR with master cam CR, by a solenoid controlled pressure fluid actuated, double actuating cylinder and piston unit 70. Referring to Fig. 8 in particular, this unit 70 includes a cylinder 70a having a double acting piston therein including and represented by a piston rod or plunger 70b which extends outwardly through one end or head of the cylinder 70a. This cylinder and piston unit 70 is mounted in fixed position on and disposed horizontally beneath the left-hand side of the body 19 of the saddle S in position adjacent and generally parallel with the left-hand side wall of the knee 3. The piston rod or plunger 70b of this unit 70 extends rearwardly from the rear end or head of the cylinder 70a and is pivotally coupled by a link 72 with the outer end of a crank arm 73 which is fixed on the lower end of the yoke spindle 51 within the knee 3 and which extends radially and horizontally outwardly therefrom through a suitable space or opening in the left-hand side wall of the knee 3 of dimensions to give operating clearance for the crank arm. Thus, by reciprocation of the cylinder piston plunger 70b the crank arm 73 will be swung forwardly or rearwardly to swing the yoke member 50 to the right or to the left when facing the front of the machine.

The cylinder and piston unit 70 is selectively controlled to displace the plunger 70b thereof rearwardly or forwardly, that is, outwardly or inwardly relative to the cylinder 70a by a solenoid operated pressure fluid controlling valve unit 71 (see Fig. 8). This unit 71 is connected with and receives pressure fluid, such as air under pressure, from a suitable source (not shown), and through a system of pipe lines 71a is coupled with the cylinder 70a of the unit 70 for reciprocation of the plunger 70b. The pipe lines 71a are coupled between the double-acting cylinder and piston unit 70 and the four-way valve unit 71 in the usual arrangement familiar in the art for controlling the functioning of a double-acting cylinder and piston unit from a four-way valve so that it is not believed necessary herein to specifically describe such arrangement. Suffice it to explain that the four-way valve unit 71 delivers pressure fluid supplied thereto from the pressure fluid source (not shown) to the forward end of the cylinder 70a when the plunger 70b is to be displaced rearwardly while causing the exhausting of pressure fluid from the rear end of the cylinder, or, alternately delivers pressure fluid to the rear end of the cylinder 70a when the plunger 70b is to be displaced forwardly with pressure fluid then being exhausted from the opposite or forward end of the cylinder. Thus, when the control circuits to the solenoid 71R of unit 71 are closed, and the control circuits to the solenoid 71L are opened, the solenoid 71R is energized and operates and conditions the four-way valve unit 71 for operation of the piston and cylinder unit 70 to displace the plunger 70b thereof forwardly to thereby swing the yoke 50 to the right into position with the tracer spindle TR thereon engaged with the master profile surface MP of the master cam CR and with tracer spindle TL moved thereby to position disengaged from master profile MP of cam CL. When the control circuits for the solenoids 71L and 71R are closed to the solenoid 71L and opened to the solenoid 71R, solenoid 71L is energized and operates the four-way valve unit 71 to a position to cause pressure fluid operation of the cylinder and piston unit 70 to displace the plunger 70b of the latter unit rearwardly to thereby swing the yoke 50 to the left and engage the tracer spindle TL thereon with the master profile surface MP of the master cam CL, while moving the tracer spindle TR forwardly to inactive position disengaged from the master profile MP of the master cam TR. The electrical circuits for selectively alternately energizing the solenoids 71L and 71R are controlled by selective operation of the cutter spindle feed mechanisms to selectively open and close the switches 16 and 17 on opposite ends of the ram head 6 through the medium of the cam members 18L and 18R on the operating shafts of the separate and independent cutter spindle feed mechanisms. Thus, when the left-hand group or pair of cutter spindles 7S and 8S is fed downwardly to operative milling positions by the hand lever 15L, the cam 18L will close the circuit to the solenoid 71L of valve unit 71 and cause swinging of the yoke 50 to engage tracer spindle TL with the profile master MP of the master cam CL and disengage tracer spindle TR from master cam CR. When the left-hand pair of cutter spindles is raised by its feed mechanism, cam 18L will open the circuit to solenoid 71L and then when the right-hand pair of cutter spindles 9S and 10S is fed downwardly to operative milling positions by the hand lever 15R, the cam 18R will close the circuit to the solenoid 71R of valve unit 71 and cause that unit to effect an operation of the cylinder and piston unit 70 to swing the yoke 50 to the right and thereby engage tracer spindle TR with the master profile MP of the master cam CR, the tracer spindle TL being swung simultaneously by the yoke member to inactive position disengaged from the master profile MP of the master cam CL.

In the operation and functioning of the tracer spindle carrying yoke member 50 by the cylinder and piston unit 70, the yoke member is pressure fluid locked in its alternate positions with a tracer spindle operatively engaged by the master profile surface MP of a master cam. Thus, when the yoke member is swung to the right to engage tracer spindle TR with the master cam CR with the yoke member then engaged against the stop or limit pin 54R, the yoke member and the tracer spindle TR are rigidly held and maintained in that position by the piston and cylinder unit 70 under the forces of the pressure fluid acting therein. Similarly, when the yoke member 50 is swung to the left into abutting engagement against the stop or limit screw 54L and with the tracer spindle TL in operative engagement with the master cam TR, the yoke member and tracer spindle TL are rigidly locked and maintained in that position by the forces being exerted by the pressure fluid in the cylinder and piston unit 70. In either of the alternate operative positions of the yoke member 50 and the tracer spindles TL and TR which it carries, the forces locking the yoke member in that position are of substantially greater magnitude than the biasing forces exerted on the worktable assembly by the biasing unit 60 and by the other forces to which the yoke member and a tracer spindle may be subjected in the profile milling operation when in operative engagement with a master cam.

*Automatic control of the profile milling cycle*

In the example machine for milling the annular profile or cam surface WP on a work piece W, the milling cycle is performed and completed by one complete revolution of the rotary worktable on which the work piece is clamped. In accordance with the invention as expressed in the example machine hereof, each group of worktables, in this instance the left-hand pair of tables 21 and 22 and the right-hand pair of tables 23 and 24, is provided with an automatic control by which, upon completion of one revolution of such a pair of tables and the completion of the milling operation on work pieces on such tables, the rotation of the tables is automatically stopped through automatic declutching and disengaging of the electro-magnetic clutch unit of the rotary drive mechanism for such a pair of tables. Such automatic controls for the drives for each pair or group of the rotary worktables include a micro switch 75L mounted on the frame structure 20F of the worktable assembly 20 adjacent, but spaced outwardly from the left-hand side of the tracer spindle carrying yoke member 50, and a similar micro switch 75R mounted on the frame structure 20F adjacent but spaced from the right-hand side of the yoke member 50, as particularly shown in Fig. 3 of the drawings. Each of the micro switches 75L and 75R includes a horizontally disposed and forwardly extending switch actuating plunger 76, each of these microswitches being of the normal closed contact type to thereby normally close a circuit through such contacts with the actuating plungers thereof being spring-loaded and normally biased to forwardly projected positions. Depression of a switch plunger 76 of either the switch 75L or the switch 75R will actuate the switch contacts to disengaged relation, thus opening a circuit into which such contacts are connected.

Referring now to Fig. 11, each switch 75L and 75R includes a forwardly extending bracket member 77 at the forward side thereof adjacent the switch actuating plunger 76 with an operating bell crank member 78 pivotally mounted in each bracket 77 in position extending horizontally and forwardly therefrom for rocking about a vertical pivot pin 78a. The crank arm 78 of switch 75L extends forwardly to and is spaced a slight distance rearwardly from the cam profile forming rib 31 of the master cam CL and such crank arm mounts in the forward end thereof a horizontally disposed contact roller 79L which is rotatable about a vertical axis. This roller 79L extends into the path of rotation of the pin and roller 33—34 which depends vertically from the underside of such master cam rib 31 so that the roller 79L will be engaged by the pin roller 33—34 at the end of the revolution of the master cam CL and worktable 22 and by such engagement will rock bell crank member 78 outwardly to the left and thereby cause member 78 to depress the switch actuator plunger 76 to open a circuit in which the switch contacts are connected.

The crank arm 78 of switch 75R extends forwardly to and is spaced a slight distance rearwardly from the cam profile forming rib 31 of the master cam CR. The crank arm 78 of switch 75R mounts on the forward end thereof a horizontally disposed contact roller 79R which is rotatable on the crank arm about a fixed vertical axis. The roller 79R has a diameter such that it extends into the arcuate path of movement of the pin and roller 33—34 which depend vertically from the underside of the master profile or cam rib 31 of the master cam CR, so that the roller 79R will be engaged by the pin and roller 33—34 at the end of a revolution of the master cam CR and the worktable 23 with which it is mounted. The engagement of the contact roller 79R by the pin and roller 33—34 on master cam CR will rock the bell crank lever 78 of switch 75R outwardly and to the right and thereby cause member 78 to depress the switch actuator plunger 76 of switch 75R to thereby open a circuit in which the contacts of such switch are connected.

The milling cycle controlling switch 75L of the left-hand pair of worktables 21 and 22 is connected into and controls a circuit to be hereinafter described for energizing and deenergizing the electro-magnetic clutch 26L of the independent drive for rotating the worktables 21 and 22. The milling cycle controlling switch 75R of the right-hand pair of worktables 23 and 24 is connected into and controls a circuit to be hereinafter described for energizing and deenergizing the electro-magnetic clutch 26R of the independent drive for rotating the worktables 23 and 24. Thus, when the left-hand worktables 21 and 22 are being rotated in the performance of a milling cycle upon completion of one revolution, the switch 75L will be actuated to open the circuit through the electro-magnetic clutch 26L and thus instantly cause such clutch to disengage and stop rotation of the worktables. And in the same manner, when the right-hand worktables 23 and 24 are rotating in the performance of a milling cycle and complete one revolution, the switch 75R is actuated to open the circuit to the then energized electro-magnetic clutch unit 26R to thus deenergize that clutch and cause it to instantly declutch and disengage the drive mechanism to and thus stop rotation of the right-hand tables 23 and 24.

*Work clamping mechanisms*

Each of the rotary worktables 21, 22, 23 and 24 has mounted thereon for rotation therewith as a unit, a work piece clamping mechanism 80. The work clamping mechanisms 80 are identical and each comprises a body structure 81 which includes a base 81a suitably attached and secured to the upper side of a worktable. Referring to Fig. 5 in particular, the body structure 81 includes and provides therewithin a pressure fluid cylinder 82 which is horizontally disposed in mounted position of a unit 80 on a worktable, the cylinder 82 being disposed and positioned on and across a diameter of the worktable. The cylinder 82 of each unit 80 includes the opposite end plungers or pistons 83 which actuate the diametrically opposite clamping jaws 84 pivotally mounted on the body structure 81, the clamping jaws being pivotally coupled at their lower ends to the outer ends of the opposite plungers 83, respectively. The plungers 83 of each unit 80 are continuously biased inwardly toward each other by spring means 83a to normally swing the clamping jaws 84 upwardly and outwardly to unclamped positions for the loading of a work piece on the table. The plungers or pistons 83 of each clamping unit 80 are adapted to be swung downwardly and inwardly to and to be held in work piece clamping positions by the pressure fluid admitted into the cylinder 82 between the inner ends of the plungers to thereby force the plungers outwardly against the biasing spring means 83a.

In order to hold to a minimum the spacing required between the rotary worktables 21, 22, 23 and 24, the clamping mechanisms 80 are mounted on these tables so that when the clamping mechanisms 80 on the inner tables 22 and 23 are in a position with the cylinders 82 therof are parallel, then the clamping mechanisms 80 on the outer or end tables 21 and 24 are in positions with the axes of their operating cylinders 82 disposed normal to the axes of the parallel cylinders of the clamping mechanisms 80 on the inner pair of tables 22 and 23. Thus, as tables 21 and 22 are rotated in opposite directions and as tables 23 and 24 are rotated in opposite directions, and as the pair of tables 21 and 22 and the pair of tables 23 and 24 are never rotated together, it follows that even with the close spacing between table centers, there will be no interference between radially outwardly projecting structure of adjacent work clamping mechanisms 80 during the operation of the machine.

A pressure fluid system supplies pressure fluid to the work clamping mechanisms 80 on the rotary worktables 21, 22, 23 and 24 from a suitable source of pressure fluid, (not shown) which may be compressed air as in this present example. Referring now to Fig. 5 in particular, this fluid pressure supply system includes pressure fluid lines 85 mounted and carried on the worktable assembly frame structure 20F in position thereon extending below the hollow spindles or shafts 21a, 22a, 23a and 24a of the rotary worktables. A vertically disposed pressure fluid supply pipe 86 extends from the supply lines 85 vertically axially upwardly through the hollow spindle 21a of worktable 21 and is connected into the cylinder 82 of the work piece clamping mechanism 80 mounted on that table, the lower end of pipe 86 being suitably connected at 86a into the lines 85. A similar, but longer, pressure fluid supply pipe 87 extends vertically axially upwardly from the supply lines 85 with which it makes connection at 87a, through the spindle 22a of worktable 22 to the upper end of that spindle where it is suitably connected into the cylinder 82 of the work clamping mechanism 80 on that table. A pressure fluid supply pipe 88, identical with the pipe 87, extends vertically axially upwardly from a point of connection 88a in the supply lines 86, through the hollow spindle 23a of the worktable 23. This pipe 88 extends upwardly to adjacent the upper end of spindle 23a where it is suitably connected into the cylinder 82 of the work clamping mechanism 80 on table 23. A vertical pressure fluid supply pipe 89, extends vertically upwardly from a connection 89a in the lines 85 and axially through the hollow spindle 24a of the worktable 24, to adjacent the upper end of that spindle where a suitable connection is made into the cylinder 82 of the work clamping mechanism 80 on the rotary worktable 24.

The work clamping mechanisms 80 on the left-hand pair of rotary worktables 21 and 22 are operated as a unit pair from a single fluid control valve for manual actuation by the machine operator. And similarly, the work clamping mechanisms 80 on the right-hand pair of worktables 23 and 24 are operated as a unit pair from a control valve by manual actuation thereof by the machine operator. As will be clear by reference to Fig. 12, the clamping mechanisms 80 on the worktables 21 and 22 are controlled from and by the manually operable control lever 90L located on the left-hand side of the front of the machine (see Fig. 1), while the clamping mechanisms 80 on the worktables 23 and 24 are controlled from and by the manually operable control lever 90R located on the right-hand side of the front of the machine.

The work clamping mechanisms 80 on the left-hand pair of worktables 21 and 22 are controlled by a fluid valve 91L by manual operation of the control lever 90L, while the work clamping mechanisms 80 on the right-hand pair of tables 23 and 24 are controlled by a valve 91R by manual operation of the control lever 90R. The control valves 91L and 91R with the respective manual control levers 90L and 90R therefor and the operating mechanisms connecting such control levers with the valve units are all located on the front side of the machine in positions on and carried by the saddle S in front of the worktable assembly 20 with operating clearance for the cross-movements of the assembly 20 in the operation of the machine.

The operating mechanisms by which movements of the manual operating levers 90L and 90R are translated into control movements of their respective control valve units 91L and 91R, are identical. In the case of the valve unit 91R and its control lever 90R, the valve unit mounts a vertically disposed bracket 90a at the right-hand side thereof which may be bifurcated at its upper end to mount therein a horizontally disposed transverse pivot pin 90c on which the manual control lever 90R is pivotally mounted intermediate its ends with the outer or right-hand end of the lever mounting thereon an operating knob 90d. The valve unit 91R includes the vertically upwardly extending valve actuating stem or plunger 90e having at the forward side thereof the horizontally forwardly extending pivot stud 90f thereon which is received in the forked inner end of operating lever 90R for engagement by that lever to raise the valve stem 90e by downward swinging of the outer length of lever 90R and to depress said stem 90e by upward movements of the outer end of lever 90R from its downwardly swung position. The valve unit 91R may be of any desired type familiar in the art for functioning when the operating lever is depressed from its raised position to open the valve for supply of pressure fluid to the cylinders 82 of the clamping mechanisms 80 on worktables 23 and 24 to swing the clamping jaws 84 downwardly to work clamping positions, and when swung upwardly to depress the valve stem 90e to cause the valve to shut off the supply of pressure fluid to the clamping mechanisms and permit exhausting of pressure fluid from the cylinders 82 thereof, so as to release the clamping jaws 84 for upward and outward swinging under the action of the spring biasing means 83a to their unclamped, work releasing and work loading positions.

The operating mechanism for the manual control lever 90L by which that lever operates and controls the pressure fluid valve unit 91L which controls and operates the clamping jaws 84 of the work clamping mechanisms 80 on the worktables 21 and 22 is identical with that described above in connection with the manual operating lever 90R and control valve 91R for the clamping mechanisms 80 on the right-hand worktables 23 and 24. The valve unit 91L is provided with the vertically upwardly extended bracket 90a located at the left-hand, that is, the outer side thereof, with this bracket mounting the pivot pin 90c on which the operating lever 91R is pivotally mounted. The operating arm 90L has the bifurcated inner end which is pivotally connected by the pivot pin 90f with the actuating plunger or stem 90e of the valve unit 91L. The outer end of the control lever 90L is provided with the manual operating knob 90d thereon.

*The interlock switches controlled by the manual valve operating levers of the work clamping mechanisms*

The manual operating levers 90R and 90L selectively control and actuate interlock switches 201 and 301, respectively, in a manner such that when a valve operating lever is in valve closing position with the clamping mechanism controlled thereby in unclamped position, it is impossible to operate the group or pair of rotary worktables on which such unclamped work clamping mechanisms are mounted. In carrying out this feature of the invention in the present example, an interlock switch 301 which is controlled by the operating lever 90L of the valve unit 91L for the work clamping mechanisms 80 on the left-hand pair of worktables 21 and 22, is in the form of a micro switch mounted on the frame structure 20F of the worktable assembly 20 in position below the outer end length of the operating lever 90L, as will be clear by reference to Fig. 12. This switch 301 is of the normal open type and includes a switch operating pin or plunger 301a which extends vertically upwardly from the upper side of the switch in line with and for actuating engagement by the lever 90L when that lever is depressed into position in which it opens the control valve 91L for discharge of pressure fluid to and clamping operation of the work clamping mechanisms 80 on the left-hand pair of worktables 21 and 22. Thus, when the valve operating lever 90L is depressed into position opening the control valve 91L, it engages and depresses the plunger 301a of the switch 301 and closes the circuit therethrough and when the lever 90L is swung upwardly to position closing the control valve 91L to shut off supply of pressure fluid thereto and exhaust fluid therefrom for opening of the clamping mechanisms 80 of tables 21 and 22 to unclamped positions, the switch 301 opens and thereby opens the circuit therethrough which it controls.

A similar interlock switch 201 of the normally open type, having the switch actuating plunger 201a, is mounted on the frame structure 20F of the worktable assembly 20 in position below the outer end length of the valve operating lever 90R for engagement of the switch plunger 201a by the operating lever 90R when the latter is swung downwardly to position opening the control valve 91R for discharge of pressure fluid into and work clamping operation of the work clamping mechanisms 80 on the pair of right-hand worktables 23 and 24. Thus, when valve operating lever 90R is in its upwardly swung position with the control valve 91R closed and the work clamping mechanisms 80 in open position for work loading, the interlock switch 201 is in its normally open position with the circuit in which it is connected opened thereby, as shown in Fig. 12. When, however, valve operating lever 90R is swung downwardly to position opening the control valve 91R for work clamping operation and positioning of the clamping mechanisms 80 on the right-hand pair of worktables 23 and 24, the switch plunger 201a is engaged and depressed thereby to close switch 201 and thus close the circuit in which such switch is connected.

As will be hereinafter more fully described and explained in connection with the control circuit network for the machine of this example, the switch 301 is connected into the control circuits which control the operations of the left-hand pair of worktables 21 and 22, while the switch 201 is connected into the circuits which control the operations of the right-hand pair of worktables 23 and 24. Hence, when switch 301 is open, the left-hand pair of worktables 21 and 22 cannot be operated, while, when the switch 201 is open, the right-hand pair of worktables 23 and 24 cannot be operated.

*Power circuits*

The machine of this example includes the spindle drive motors 11 for the left-hand set of cutter spindles 7S and 8S and the motor 12 for the right-hand set of cutter spindles 9S and 10S, together with the motor 25L for the drive for rotating the left-hand pair of worktables 21 and 22 and the motor 25R for the drive for rotating the right-hand pair of worktables 23 and 24. The example machine is also provided with a coolant system which includes a coolant pump motor 25C, but as this coolant system forms no part of the present invention, it is not disclosed herein except for the coolant discharge nozzles N thereof shown in Fig. 4 and the coolant pump motor 25C for the systme, shown only schematically in the power circuit diagram of Fig. 16.

Referring to Fig. 16, the motors 25C, 25L, 25R, 11 and 12 of the machine are supplied with power from any suitable source (not shown), say 3-phase, 220 volt, A. C. current by the power lines L1, L2 and L3 into which the motors are connected by the lines PL1, PL2 and PL3. Power lines L1 and L2 lead to the primary winding of the master power transformer 1PT, from the secondary of which current is supplied to the control circuit network of the machine, as shown in Fig. 17, and which control circuits will be hereinafter described. The power transformer 1PT may be considered to step down the 220 volt, A. C. current supplied to the primary thereof, to a 110 volt A. C. control current in the secondary of the transformer. Referring to Figs. 16 and 17, the control circuits include the circuit lines X1 and X2 from the secondary of the transformer 1PT across which there is connected a circuit line CL1 in which there is connected the energizing coil of a master relay M1 having the normally open relay contacts M2, M3 and M4 actuated thereby and located in the power lines L1, L2 and L3, respectively, which supply the power to the several motors of the machine as above identified. In the control circuit line CL1, as shown in Fig. 16, a master start switch 100 is connected between the energizing component M1 of the master relay and the circuit line X1, together with a master stop switch 101 in the line CL1 connected therein between the master start switch 100 and the line X1. Thus, with the master start switch 100 and the master stop switch 101 closed, component M1 of the master relay is energized to close the master relay contacts M2, M3 and M4 and thus close the power circuits to the several motors of the machine.

The master start switch 100, together with its manual operating button, is mounted on the central portion of the ram head 6 of ram R of the machine between the cutter heads 8 and 9, with the stop switch 101 and its manual operating button being located and positioned immediately above the start switch 100, as will be clear by reference to Fig. 1.

*Control circuits*

The electro-magnetic clutch 26L for the drive to the left-hand pair of worktables 21 and 22 includes the clutch actuating coil 102L and the electro-magnetic clutch 26R for the drive for the right-hand pair of rotary worktables 23 and 24 includes the actuating coil 102R. As the clutches 26L and 26R are of the direct current type, the alternating current supplied to the control circuits by the secondary winding of the power transformer 1PT is rectified to direct current by the rectifiers 103L and 103R connected into the circuits to the actuating coils 102L and 102R, respectively, of the clutches. Referring to the control circuit network diagram of Fig. 17, the clutch actuating coil 102 R of clutch 26R is connected across the rectifier 103R which, in turn, is connected across the circuit lines CL2 and CL3 connected across the control circuit supply lines X1 and X2. Similarly, the actuating coil 102L of the clutch 26L is connected across rectifier 103L which is, in turn, connected across circuit lines CL4 and CL5 connected across the control current supply lines X1 and X2.

The cycle of the right-hand pair of worktables 23 and 24 is controlled basically through the medium of the clutch 26R in the power drive for rotating such tables. The circuit through the actuating coil 102R includes an "on" switch 104 and a "stop" switch 105 in the circuit line CL3. Thus the circuit through the clutch can be conditioned for closing and for operation of the clutch by closing the switches 104 and 105. Similarly, the cycle of the left-hand pair of worktables 21 and 22 is controlled through the medium of the clutch 26L in the power drive for rotating such tables. For opening and closing the circuit through the clutch 26L an "on" switch 106 and a "stop" switch 107 are connected in the circuit line CL5 of the circuit through the actuating coil 102L of the left-hand clutch 26L for conditioning that circuit for closing and for operation of clutch 26L.

A circuit line CL6 is connected across line X2 and the circuit line CL3 and a circuit line CL7 is connected between circuit line CL6 and circuit line CL3. A relay R1 is connected in circuit line CL6 between line X2 and the point of connection of the circuit line CL7 in line CL6. The relay R1 includes sets of normally open contacts CR1' connected in circuit lines CL3 and CL7 so that closing of the circuit in line CL6, through the relay R1 causes the relay to simultaneously close the sets of contacts CR1' in circuit lines CL3 and CL7.

A circuit line CL8 is connected between line X2 and circuit line CL6, being connected into circuit line CL6 at a point between the connection of that line with line CL3 and the relay R1. A "start" switch 108 for a cycle of operation of the right-hand pair of worktables 23 and 24 is provided connected into the circuit lines CL6 and CL8, this switch providing a set of spaced contacts 108a and a set of spaced contacts 108b in the circuit lines CL6 and CL8, respectively. The "start" switch 108 is normally open to open the circuits through the lines CL6 and CL8 and thereby deenergize clutch 26R with that clutch in disengaged position rendering the drive to the tables 23 and 24 inactive with the tables at rest. A circuit line CL9 is connected aroun the contacts 108b of switch 108 in the circuit line CL8. A relay R3 is connected in line CL8 and this relay includes a set of normally open contacts CR3' in circuit line CL3 located between the points of contact of circuit lines CL7 and CL6 with line CL3, and a set of normally open contacts CR3 in the circuit line CL9. Thus, closing of the circuits through lines CL6 and CL8 by closing the "start" switch 108 actuates the relays CR1 and CR3 to simultaneously close the sets of contacts CR1 in the lines CL3 and CL7 and the sets of contacts CR3 in the lines CL3 and CL9. Hence, with switches 104 and 105 closed, when the "start" switch 108 is closed, the circuits through the rectifier 103R are closed with the rectifier then delivering direct current to actuate the coil 102R of clutch 26R to thereby start the cycle of rotation of the pair of right-hand tables 23 and 24.

The automatic control of the profile milling cycle of the right-hand pair of worktables 23 and 24 is through the medium of the micro switch 75R referred to hereinbefore, which is mounted on the framework 20F of the worktable assembly 20 at the rear of the master cam CR. This switch 75R is connected in the circuit line CL7 between the sets of relay contacts CR1 and the connection of line CL7 with the line CL3. The automatic cycle control switch 75R includes the contact 95 in circuit line CL7 and the contact 96 connected into circuit line CL3 between the rectifier 103R and the set of relay contacts CR1. Switch 75R has one position engaged with contact 95 and disengaged from contact 96 to thereby close a circuit through line CL7. Switch 75R when in position engaged with contact 95 and closing the circuit through line CL7 conditions and establishes the right cycle circuits for rotation of the right-hand pair of worktables 23 and 24 through a profile milling cycle. When switch 75R is moved to its other position in which it opens the circuit through line CL7 and closes a circuit through contact 96, the circuit of the actuating coil 102R of the right-hand clutch 26R is being held through R3 and setting up the cycle so that CR1 will drop out thereupon when end of right-hand table cycle is brought about, "an actuating pin resting on limit switch 75R and return of switch on contacts 95, then" the clutch is disengaged in the drive mechanism with resulting stoppage of the rotation of the right-hand pair of worktables 23 and 24. The cycle control switch 75R is actuated from closed position engaged with contact 95 to open position engaged with contact 96 by the pin and roller 33—34 on the master cam CR engaging the switch actuating mechanism when the master cam completes one revolution, that is, completes a profile milling cycle of rotation of the right-hand pair of rotary worktables 23 and 24.

The "stop" switch 105 for the right-hand pair of worktables 23 and 24 is mounted on the ram head 6 spaced between the cutter heads 9 and 10 with the "start" switch 108 for a milling cycle of the right-hand tables 23 and 24 mounted on the ram head 6 immediately below the "stop" switch 105, as shown in Fig. 1.

A circuit line CL10 is connected across line X2 and the circuit line CL5 and the circuit line CL11 is connected between circuit line CL10 and line CL5. A relay R2 is connected in line CL10 between line X2 and the point of connection of the line CL11 into line CL10. The relay R2 includes a set of normally open contacts CR2' connected in circuit line CL5 and a set of normally open contacts CR2' connected in line CL11, so that closing of the circuit in line CL10 through the relay R2 causes the relay to simultaneously close the sets of contacts CR2' and CR4 in and thereby close lines CL5 and CL11 therethrough.

A circuit line CL12 is connected between line X2 and circuit line CL10. The line CL12 is connected into the line CL10 at a point between the connection of the latter line with the line CL5 and the relay CR2. A "start" switch 109 for a cycle of operation of the left-hand pair of worktables 21 and 22 is provided connected into the circuit lines CL10 and CL12. The switch 109 provides spaced contacts 109a in the line CL10 and spaced contacts 109b in the line CL12. The "start" switch 109 is normally open to open the circuits through lines CL10 and CL12 and thus deenergize clutch 26L with that clutch in disengaged position rendering the drive to the tables 21 and 22 inactive with such tables at rest. A circuit line CL14 is connected around and bridges the contacts 109b of switch 109 in the circuit line CL12. A relay R4 is connected in line CL12 and includes a set of normally open contacts CR4' located in circuit line CL5 between the points of connection of circuit lines CL11 and CL12 with line CL5, and a set of normally open contacts CL4' in the circuit line CL14. Thus, closing of the circuits through lines CL10 and CL12 by closing the "start" switch 109 will actuate the relays R2 and R4 to simultaneously close the sets of contacts CR2' in the lines CL5 and CL11 and to close the sets of contacts CR4' in the lines CL5 and CL14. Hence, with the switches 106 and 107 closed, when the "start" switch 109 is closed, then the circuits through the rectifier 103L are closed so that the rectifier delivers direct current to actuate the coil 102L of clutch 26L to thereby start the cycle of rotation of the pair of tables 23 and 24.

The automatic control of the profile milling cycle of the left-hand pair of tables 21 and 22 is through the medium of the micro switch 75L, referred to and identified hereinbefore, which is mounted on the framework 20F of the worktable assembly 20 at the rear of the master cam CL. The switch 75L includes the contact 97 in circuit line CL11 and the contact 98 connected in the circuit line CL5 between the rectifier 103L and the set of relay contacts CR2. Switch 75L has one position engaged with contact 97 and disengaged from contact 98 to thereby close a circuit through line CL11. Switch 75L when in position engaged with contact 97 and closing the circuit through line CL11 conditions and sets up the left cycle circuits for rotation of the left-hand pair of worktables 21 and 22 by the drive mechanism for those tables. When switch 75L is moved to its other position in which it opens the circuit through line CL11 and closes a circuit through the contact 98, the circuit of the actuating coil 102L of the left-hand clutch 26L is being held through R3 and setting up the cycle so that CR2 will drop out thereupon when end of left-hand table cycle is brought about, an activating pin resting on limit switch 75L and return of switch on contacts 97, then the clutch is disengaged in the drive mechanism with the resulting stoppage of the rotation of the left-hand pair of worktables 21 and 22. The cycle control switch 75L is actuated from closed position engaged with contact 97 to open position engaged with contact 98 by the pin and roller 33—34 on the master cam CL engaging the switch actuating mechanism when the master cam completes one revolution, that is, completes a profile milling cycle of rotation of the left-hand pair of rotary worktables 21 and 22.

The "stop" switch 107 for the left-hand pair of worktables 21 and 22 is mounted on the ram head 6 spaced between the cutter spindles 7 and 8 with the "start" switch 109 for a milling cycle of the tables 21 and 22 mounted on the ram head 6 immediately below the "stop" switch 107, as shown in Fig. 1.

The operating and controlling circuits for the solenoids 71L and 71R of the pressure fluid control valve unit 71 by which selective operation of the cylinder and piston unit 70 is obtained to swing the tracer spindle carrying yoke 50 to engage tracer spindle TL with master cam CL or to engage tracer spindle TR with master cam CR, include the circuit line CL15 in which the right-hand solenoid 71R is connected and the circuit line CL16 in which the left-hand solenoid 71L is connected. The line CL15 at one end thereof provides the contact 110 which is designated as an "on" contact, and at the opposite end is connected to a contact 111 which is designated as an "off" contact. The line CL16 is connected at one end to a contact 112 which is opposite but spaced from contact 110 and which is designated as an "off" contact. The line CL16 at the end thereof opposite contact 112 is connected into a contact 114 opposite but spaced from contact 111 of line CL15, which contact 114 is designated as an "on" contact.

A switch 16 is connected to the control current supply line XL. The switch 16 includes a movable contact arm 16a for engagement with contact 110 of line CL15 or for engagement with contact 112 of line CL16. A similar switch 17 is connected to the current supply line X2 and includes a movable contact arm 17a for engagement with contact 111 of line CL15 or for engagement with contact 114 of line CL16. The switch 16 is operated and controlled by the cam 18L on the feed shaft 14L of the feed mechanism for the left-hand pair of cutter spindles 7S and 8S, while the switch 17 is operated and controlled by the cam 18R on the feed shaft 14R of the feed mechanism for the right-hand pair of cutter spindles 9S and 10S. As shown in Fig. 17, when the machine is conditioned and set for profile milling operations with the right-hand pair of cutter spindles 9S and 10S and the right-hand pair of worktables 23 and 24, cam 18R, with the manual operating lever 15R of the feed mechanism swung downwardly, the switch 17 is operated to position with the contact arm 17a thereof in contact with contact 111 of line CL15, while the left-hand spindle feed mechanism is in position with the cutter spindles 7S and 8S raised so that the contact arm 16a of switch 16 is positioned in contact with the contact 110 of circuit line CL15, thus closing the circuit through solenoid 71R while the circuit through solenoid 71L is open. With the right-hand pair of cutter spindles 9S and 10S raised to inactive positions and the left-hand pair of cutter spindles 7S and 8S fed downwardly to their operative profile milling positions, contact arm 17a of switch 17 will then be in position in contact with contact 114 of line CL16 and contact arm 16a of the switch 16 will be in contact with the contact 112 of line CL16, thus closing the circuit through the left-hand solenoid 71L and opening the circuit through the right-hand solenoid 71R. Activation of the right-hand solenoid 71R of the control valve unit 71 causes operation of the yoke member 50 by the cylinder and piston unit 70 to engage the tracer spindle TR with the master profile MP of the master cam CR. Activation of the left-hand solenoid 71L with the opening of the circuit through the right-hand solenoid 71R will cause operation of the yoke member 50 to disengage the tracer spindle TR and engage the tracer spindle TL with the master profile MP of the master cam CL.

The switch 16 is mechanically interlocked with the "on" switch 106 controlling what may be called the left cycle of the machine, as represented by the dotted line 16b in Fig. 17. Similarly, the switch 17 is mechanically interlocked with the "on" switch 104 of what may be called the right cycle circuits for the machine, as represented by the dotted line 17b in Fig. 17. Thus it is apparent that when the switches 16 and 17 are set and conditioned closing the circuit through solenoid 71R for right cycle operations, the "on" switch 104 is in contact with contact 104a in line CL3 while "on" switch is in contact with the contact 106b in line CL5. The switches 104 and 106 are connected by a circuit line CL17. A line CL18 is connected into line X1 and leads to a contact 104b of switch 104 while a line CL19 is connected into X1 and leads to a contact 106b of switch 106. Thus, due to the mechanical interlocks 16b and 17b, when the switches 16 and 17 are set and conditioned to open the circuit through right-hand solenoid 71R and to close the circuit through solenoid 71L for a left-hand cycle of operations, switch 104 is actuated out of contact with contact 104a and into circuit closing contact with the contact 104b, while the switch 106 is actuated to position out of contact with the contact 106b and into circuit closing contact with the contact 106a in line CL19.

The switch 201 that is controlled by the manually operated lever 90R for the control valve 91R is connected in the section CL3' of the line CL3 between the connection of the line CL6 therewith and the set of relay contacts CR3 in the line CL3. When the valve control lever 90R is in downwardly swung position to open the air valve 91R to supply air to the work piece clamping mechanisms 80 on the right-hand pair of worktables 23 and 24, the switch 201 is operatively engaged by lever 90R and actuated thereby to circuit closing positions as shown in Fig. 17. When the manual control lever 90R is in its raised position to close the air valve 91R to shut off supply of air to and exhaust air from the work clamping mechanisms 80 on tables 23 and 24, the switch 201 is opened to thereby open the circuit through lines CL3, CL6, and CL8.

The switch 301 that is operated and controlled by the manual operating lever 90L for the air valve 91L which controls the operation of the work piece clamping mechanism 80 on the left-hand pair of worktables 21 and 22, is connected in the section CL5' of the circuit line CL5 between the connection therewith of the line CL10 and the set of relay contacts CR4 in line CL5. The switch 301 is adapted to be engaged and operated to circuit closing position by the manual control lever 90L when that lever is swung downwardly in position opening the air valve 91L for supplying air under pressure to the work piece clamping mechanisms 80 on tables 21 and 22 to operate such mechanisms to work clamping positions. When, on the other hand, the lever 90L is swung upwardly to its raised position closing the air valve 91L, the switch 301 is opened to thereby open the circuits through the circuit lines CL5, CL10 and CL12.

A limit switch 200 is connected in circuit line CL3' between switch 201 and the connection of line CL3' in line CL3. This limit switch 200 is mechanically interlocked, as indicated by the dotted 200a line in Fig. 17 with the left cycle switch 75L.

A limit switch 300 is connected in circuit line CL5' between the switch 301 and the connection of line CL5' into the circuit line CL5. This limit switch 300 is mechanically interlocked, as indicated by the dotted line 300a in Fig. 17 with the right cycle switch 75R.

Summary of operations

In Fig. 1 the example machine is shown in completely inactive condition with both the left-hand set of cutter spindles 7S and 8S and the right-hand set of cutter spindles 9S and 10S in their raised positions and with the work clamping mechanisms 80 of the left-hand set of rotary worktables 21 and 22 and the work clamping mechanisms 80 of the right-hand set of worktables 23 and 24 in their open positions for work piece loading. In such condition of the machine it is impossible to cause operation of either the power drive mechanism of the right-hand set of worktables 23 and 24 or the power drive mechanism of the left-hand set of worktables 21 and 22, due to the fact that the switches 104 and 106 are interlocked with the switches 16 and 17 and thereby are in positions opening the circuits through the clutches 26L and 26R in the respective independent power drives to the sets of rotary worktables.

When it is desired to perform profile milling operations with the example machine in the above condition, the operator loads work piece blanks in the work clamping mechanisms 80 of the worktables 21, 22, 23 and 24 and, for example, may start operations by first performing the profile milling on the work pieces 80 on the tables 23 and 24, that is, the right-hand pair of tables, under the control and dictation of the master cam CR. First, the operator clamps the work pieces on tables 23 and 24 by displacing the hand lever 90R located at the right-hand side of the machine to open the pressure fluid valve 91R to admit pressure fluid to the clamping mechanism 80 and at the same time to engage and operate switch 201 to thereby set up and condition the control circuits for operation of the clutch 26R to engage the driving of the motor 25R with the tables 23 and 24 so that operation of that motor will effect rotation of the tables 23 and 24.

All of the motors of the machine are set into operation by closing the master start switch 100 which is located for operation on the front of the machine between the cutter heads 8 and 9. Closing of the start switch 100 with the stop switch 101 in closed position, simultaneously closes the circuits to and starts operation of the spindle motors 11 and 12, the table drive motors 25L and 25R and the coolant motor 25C, such motors thereafter operating continuously until stopped by opening of the switch 101.

With the work pieces clamped by the clamping mechanisms 80 in position on the worktables 23 and 24 the operator manually initiates the profile milling cycle under the control and dictation of the master cam CR by swinging the cutter spindle down feed mechanism lever 15R downwardly to lower the rotating cutter spindles into operative milling positions with the work pieces on the tables 23 and 24 therebelow, respectively. As the lever 15R is swung downwardly and reaches its maximum position of the down feed for the cutter spindles 9S and 10S, the cam 18R on the down feed shaft 14R engages the micro switch 17 and thus closes the energizing circuit through the solenoid 71R of the solenoid controlled valve unit 71 so that this valve unit 71 is operated to actuate the piston and cylinder unit 70 to rock the spindle carrying yoke member 50 in a direction to engage tracer spindle TR with the master profile surface MP of the master cam CR, such rocking of the yoke member 50 swinging the tracer spindle TL on the yoke arm 53L forwardly to a position disengaged from the master profile surface of the master cam CL. With the switch 17 held closed by the cam 18R the solenoid 71R is maintained energized with the cylinder and piston unit and the yoke member 50 connected therewith pressure-locked in that position until released by reverse operation of the valve unit 71. Thus set-up and conditioned the machine is ready to perform the profile milling operation on the work pieces on the tables 23 and 24 by the operator closing the start switch 108 which is located accessible for such operation on the front of the machine between the cutter heads 9 and 10. Closing of start switch 108 closes the circuit through the energizing solenoid 102R of the clutch 26R in the power transmission from the drive motor 25R to the set of right-hand tables 23 and 24 and starts such tables in rotation. As the tables are rotated the master cam CR has its master profile surface MP maintained in engagement with the fixed position tracer spindle TR as the profile surface rotates therepast so that in accordance with the dictates of that master profile surface the table assembly 20 is given cross movements along its straightline path as the work pieces are rotated relative to the cutter spindles 9S and 10S to thereby cause the cutters on the cutter spindles S to profile mill a precise and accurate reproduction on the work pieces of the master profile MP of the master cam CR. In this example the profile milling cycle is completed by one complete revolution of the tables 23 and 24 and the work pieces clamped thereon and the worktables with the work pieces clamped thereon are automatically brought to a stop at the conclusion of the milling cycle by the pin and roller 33—34 which is mounted on and carried by the master cam CR coming into engagement with the roller 79R of the actuating mechanism for the cycle control switch 75R. Such engagement operates switch 75R to open the circuits through the clutch 26R of the drive transmission to the right-hand set of tables and thus disengage the clutch 26R from the motor 25R so that the worktables 23 and 24 are instantly brought to a stop.

Upon the completion of the profile milling on the work pieces on the worktables 23 and 24, the completed work pieces may be removed from these tables by swinging the lever 90R upwardly to cause valve 91R to shut off pressure fluid to and exhaust pressure fluid from the cylinders 82 of the work clamping mechanisms 80 so that the biasing springs 83a take over and rock the clamping jaws 84 to open, work releasing positions. When lever 90R is swung upwardly to the foregoing position for work piece unloading, the switch 201 restores to open position so that thereafter and with the work clamping mechanisms in such positions, it is not possible for the operator to again start rotation of the right-hand set of worktables until switch 201 has been again closed, that is, until the work clamping mechanisms 80 of worktables 23 and 24 are in work clamping positions.

Assuming that the left-hand set of worktables 21 and 22 have been loaded with work piece blanks, then the operator proceeds to initiate profile milling operations on the work pieces on these tables by displacing the hand lever 15L downwardly to feed the left-hand set of cutter spindles 7S and 8S into milling positions relative to the work pieces. When lever 15L reaches its position of maximum down feed, the cam 18L on the down feed shaft 14L engages and closes switch 16 to thereby close the circuit through the solenoid 71L of the pressure fluid control valve unit 71 which results in operation of the tracer spindle carrying yoke member 50 to rock that member in a direction to swing yoke arm 53L rearwardly to engage tracer spindle TL with the master profile surface MP of the master cam CL while the yoke arm 53R is swung forwardly to position with tracer spindle TR disengaged from the master profile surface MP of the master cam CR. This position of the yoke member and tracer spindles for a profile milling operation with the left-hand set of worktables 21 and 22 is shown in Fig. 3 of the drawings. The operator then initiates the profile milling operations by closing the start switch 109 which effects closing of the energizing coil or solenoid 102L of the clutch 26L of the power drive to the left-hand set of rotary tables 21 and 22, whereupon profile milling operations begin in the manner hereinbefore described in connection with the operation of the right-hand set of tables 23 and 24. The profile milling cycle with the tables 21 and 22 is automatically stopped upon the completion of one revolution of those tables by engagement of the pin and roller 33—34 mounted on the master cam CL with the actuating mechanism for the cycle control switch 75L and results in opening of that switch and of the circuit through the coil 102L of clutch 26L so that the clutch is caused to disengage and disconnect the drive from the motor 25L to this set of rotary worktables.

While the profile milling operations were being performed on the work pieces on the left-hand set of worktables 21 and 22, the right-hand set of tables 23 and 24 had been loaded with work pieces and the clamping mechanisms 80 therefor operated to work piece clamping positions preparatory to initiating profile milling operations thereon by swinging lever 15R downwardly and by closing the right cycle start switch 108.

Due to the system and arrangement thereof of interlocks provided in and by the control circuits of the example machine, it will be noted that a set of worktables cannot be operated unless and until the work clamping mechanisms on such set of tables are in closed, work clamping positions. This is so because if switch 201 of the left-hand set of tables is open, a circuit cannot be closed through clutch 26L, while similarly, if switch 301 is open, a circuit cannot be closed by the operator through the clutch 26L of the power transmission to the left-hand set of worktables.

With the machine set up and conditioned for operation of one set of worktables then if the set of cutter spindles for the other set of worktables is lowered, it will not be possible for the operator to effect operation of the drive for either set of worktables. This will be so due to the arrangement and interlocking of the switches 16 and 17 of the spindle down feed mechanisms with the switches 104 and 106.

If, during a cycle of profile milling operations, by one set of worktables and cutter spindles, such operations are stopped before the end or completion of the cycle, then it is impossible for the operator to set the other tables into operation until the tables which have been stopped in a partial cycle have been placed back in operation and completed the cycle.

If milling operations are being performed by one set of rotating tables and cutter spindles and during such operations the other set of cutter spindles are fed downwardly, the operating tables and spindles will stop and cannot be restarted until the other set of cutter spindles is raised to normal inactive position.

And, if, for example, all four cutter spindles are fed downwardly from their raised, inactive positions, then it is impossible for the operator to start either set of rotating tables into operation.

Thus, with a machine of the invention as exemplified by the machine herein illustrated and described, it is possible to profile mill work pieces in precise and accurate reproduction of patterns or masters at high rates of production. If desired, one set of worktables and cutter spindles may profile mill a different form or design of profile from that to be profile milled with the other set of worktables and cutter spindles, in which event, of course, the profile masters CL and CR of the example machine would have different master profiles MP thereon. Or, as in the set-up machine of the example, the sets of tables and cutter spindles may profile mill the same profile surfaces on the work pieces with the master cams CL and CR having the same master profiles MP thereon. In the normal operations of a machine of the invention with two sets or groups of worktables and cutter spindles, the machine may be operated by loading work pieces on one set of rotary worktables while the work pieces on the other set are being profile milled.

The machine has a relatively wide range of sizes or diameters of work pieces upon which it can efficiently operate, as the machine is readily adjustable for a particular size or diameter of work piece within the range of adjustment of the saddle S on the knee 3 to thereby adjust the distances between the centers of the worktables and the work pieces to be mounted thereon and the centers of the cutter spindles. It is to be further noted that the ram assembly R with the cutter spindles is also adjustable inwardly and outwardly of the machine and the worktables therebelow so that the machine is capable of adjustment to operate upon a relatively wide range of work piece sizes.

While a machine has been disclosed herein by way of example which comprises two (2) sets of cutter spindles and two (2) sets of rotary worktables each comprised of two (2) rotary worktables, the invention is not limited to this particular number of groups or number of components for each group. Within practical size limitations it is intended and contemplated that the invention may be carried out and exemplified in a machine consisting of two groups of rotary tables and cutter spindles in which each group is comprised by but a single table and single cutter spindle, or, in some instances, a single cutter spindle and table may be utilized. Similarly, a machine of the invention may have any desired number of rotary worktables and cutter spindles therefor in any desired grouping for alternate operations or in sequence operations of groups, and it is not intended in all respects to limit the invention in its expressions to the particular arrangement of two sets of two rotary worktables each, with two sets of two cutter spindles each for such tables. Hence, a "set" or "group" as used herein and in the appended claims may include one or more components, unless limited otherwise by the specific context in which used.

A machine of the invention, such as the example machine hereof, is adapted to and capable of internal or external profile milling and it is not intended by the showing of the example machine as set up for internal milling with the internal type of master cam CL or CR, to thereby limit and restrict the invention. In order to profile a surface externally on a work piece the profile surface on a master cam would be formed on the external peripheral edge of the cam and the direction of biasing of the work table assembly merely reversed.

It will also be evident that various changes, modifications, eliminations, substitutions and additions may be resorted to without departing from the broad spirit and scope of my invention, and hence I do not desire or intend to limit my invention in all respects to the exact and specific constructions, combinations and sub-combinations of the example machine hereof, except by specific and intended limitations thereto appearing in any of the appended claims.

What I claim is:

1. In a duplicating machine, in combination, a supporting frame structure; a table assembly mounted on said frame structure for and constrained to movements in either direction along a predetermined path of movement; sets of rotary worktables mounted on and movable bodily as a unit with said table assembly for rotation thereon independently thereof; a master cam member mounted on a rotary worktable of each set of said rotary worktables for rotation with such worktable; a tracer member for each said master cam member supported from said frame structure independently of said table assembly; each of said tracer members being mounted for movements between an inactive position and an operative position for tracing engagement by its said master cam member controlling and dictating the movements along said predetermined path of said table assembly and all of said sets of rotary worktables thereon as a unit assembly; means biasing said table assembly in a direction along its said predetermined path of movement to yieldingly maintain a master cam member in tracing engagement against its said tracer member when such tracer member is in its operative position; and means for selectively moving any one of said tracer members to operative tracing engagement with said other of said tracing members in said inactive position.

2. A multiple spindle duplicating machine including, in combination, a supporting frame structure; a table assembly mounted on said frame structure for and constrained to movements in either direction along a predetermined path of movement; sets of rotary worktables mounted on and movable bodily as a unit with said table assembly; said worktables of said sets of worktables being mounted on said table assembly for rotation thereon independently thereof; an independent powered drive mechanism for each of said sets of rotary worktables; a set of rotary cutter spindles supported from said frame structure over each said set of said rotary worktables; each of said sets of rotary cutter spindles being mounted for feeding movements thereof toward and from operative position at its said set of rotary worktables; means for feeding any one of said sets of said cutter spindles independently of said other sets of cutter spindles; a master cam member mounted on and rotatable with one of said rotary worktables of each of said sets of rotary worktables; a tracer member for each of said master cam members for tracing engagement thereby; each of said tracer members being supported from said frame structure independently of said table assembly for movements between an inactive position and an operative position in tracing engagement by its said master cam member for controlling and dictating the movements of said table assembly and all of said sets of rotary worktables thereon as a unit assembly along said predetermined path of movement; means for selectively moving any one of said tracer members to its operative position for tracing engagement by its said master cam member and said other tracer members to inactive position; and means for biasing said table assembly in a direction along its said predetermined path of movement to maintain a master cam member in tracing engagement with its said tracer member when said tracer member is in its said operative position.

3. In a multiple duplicating machine, in combination, a supporting frame structure; a table assembly mounted on said frame structure for and constrained to movements in either direction along a predetermined path of movement; sets of rotary worktables mounted on and movable bodily as a unit with said table assembly; said rotary worktables of each said set thereof being mounted for rotation independently of said table assembly about axes substantially normal to said predetermined path of movement; a master profile cam member mounted on and coaxial with a rotary worktable of each of said sets of rotary worktables for rotation therewith; a tracer carrying member pivotally mounted for swinging about an axis substantially parallel with the axes of rotation of said master profile cam members; tracers on said tracer carrying member; means for selectively swinging said tracer carrying member to position any one of said tracers thereon in operative tracing engagement by one of said master profile cam members and to position the other of said tracers out of tracing engagement with the other of said master profile cam members; and biasing means acting to bias said table assembly with said sets of rotary worktables thereon as a unit assembly in a direction to continuously maintain a master profile cam member in yielding tracing engagement with a tracer selectively positioned in tracing engagement therewith.

4. In a multiple spindle duplicating machine, in combination, a supporting frame structure; sets of rotary worktables supported from said frame structure in fixed positions relative to each other for movements bodily as a unit assembly in either direction along a predetermined path of movement; said rotary worktables of said sets being also each mounted for rotation about an axis substantially normal to said predetermined path of movement; a master cam member mounted on and coaxial with a rotary worktable of each of said sets of rotary worktables; each of said master cam members being provided with a profile surface therearound; a tracer for each of said master cam members supported from said frame structure for tracing engagement by said profile surface of its said master cam member; each of said tracers being mounted for movements between a position out of engagement with said profile surface of its said master cam member and a fixed operative position for tracing engagement by said profile surface for controlling and dictating simultaneously from such master cam member the movements of all of said sets of rotary worktables as a unit assembly along said predetermined path; and actuating means operable for selectively moving any one of said tracers to its said fixed operative position and the other of said tracers to inactive position.

5. In a multiple spindle duplicating machine, in combination, a supporting frame structure; sets of rotary worktables mounted on said frame structure for movements bodily as a unit assembly in either direction along a straight-line path; said rotary worktables of said sets being each mounted for rotation about an axis substantially normal to said straight-line path; a master cam member mounted on and coaxial with a rotary worktable of each of said sets of rotary worktables and having therearound a master profile surface; a tracer carrying member pivotally mounted for swinging about an axis substantially parallel with the axes of rotation of said rotary worktables; said tracer carrying member having arms extending to and located at one side of said master cam members, respectively; a tracer mounted on each of said arms of said tracer carrying member; said tracers being alternately movable by swinging of said tracer carrying member to positions with one of said tracers in a fixed operative position in tracing engagement by the master profile surface of its said master cam member and the other of said tracers in inactive position disengaged from its said master cam member; means for selectively swinging said tracer carrying member to position one or the other of said tracers in its fixed operative position; and means acting to continuously maintain a master cam member in tracing engagement with its said tracer when such tracer is in its fixed operative position.

6. In a multiple spindle duplicating machine, in combination, a supporting frame structure; a table assembly mounted on said frame structure for and constrained to movements in either direction along a predetermined path of movement; sets of rotary worktables mounted on and movable bodily as a unit with said table assembly and being independently rotatable thereon; sets of rotary cutter spindles supported in normally fixed positions from said frame structure in locations over said sets of rotary worktables respectively; each of said sets of cutter spindles being mounted for movements independently of said other sets of cutter spindles toward and from operative position relative to its said set of rotary worktables; means for selectively moving any one of said sets of cutter spindles to operative position relative to its said set of worktables; a master cam member for each set of said rotary worktables mounted for rotation with said worktables of said set; a tracer member for each said master cam member; each of said tracer members being mounted for movements between an inactive position and an operative position for tracing engagement by its said master cam member; actuating means for selectively moving any one of said tracer members from inactive to operative position and the other of said tracer members to said inactive position; and means operable by movement of any one of said sets of cutter spindles to operative position relative to its said set of rotary worktables for effecting operation of said tracer member actuating means to selectively move said tracer member for said master cam member of such said set of rotary worktables into its said operative position.

7. In a multiple spindle duplicating machine, in combination, a supporting frame structure; a table assembly mounted on said frame structure for and constrained to movements in either direction along a predetermined path of movement; sets of rotary worktables mounted on and bodily movable with said table assembly as a unit; each of said rotary worktables of said sets of rotary worktables being mounted for rotation on and independently of said table assembly; a master cam member mounted on a rotary worktable of each of said sets of rotary worktables for rotation therewith; a tracer carrying member movably mounted on said frame structure; a tracer on said tracer carrying member for each of said master cam members; each of said tracers being movable by said tracer carrying member between a fixed operative position in tracing engagement by its said master cam member for controlling and dictating the movements along said predetermined path of said table assembly and an inactive position disengaged from said master cam member; mechanism for selectively moving said tracer carrying member to position any one of said tracers in a fixed operative position in tracing engagement by its said master cam member and the other of said tracers in an inactive position; sets of rotary cutter spindles supported from said frame structure independently of and in positions over said sets of rotary worktables, respectively; each of said sets of rotary cutter spindles being mounted for feeding movements between an operative position and an inactive position relative to its said set of rotary worktables; an independent feed mechanism for each of said sets of cutter spindles for feeding its said set of cutter spindles independently of the other of said sets of cutter spindles; and means selectively operable by operation of any one of said independent feed mechanisms to feed its said set of cutter spindles to operative position relative to its said set of rotary worktables to effect operation of said tracer carrying member to position said tracer for said master cam member of said latter set of rotary worktables in operative position and to position said other of said tracer members in inactive position.

8. In a multiple spindle duplicating machine, in combination, a supporting frame structure; sets of rotary worktables supported from said frame structure and being mounted for movements bodily as a unit assembly in either direction along a predetermined path of movement; said rotary tables of each of said sets being also mounted for rotation about axes substantially normal to said predetermined path of movement; a master cam member mounted on and coaxial with a rotary worktable of each of said sets of rotary worktables for rotation therewith; a tracer member for and supported from said frame structure independently of each of said rotary master cam members for tracing engagement by its said master cam member; each of said tracer members being mounted for movements between an operative position with its said master cam member in tracing engagement therewith and an inactive position out of tracing engagement with its said master cam member; actuating means operable for selectively moving any one of said tracer members into operative position and said other of said tracer members into inactive position; sets of rotary cutter spindles mounted on said frame structure independently of and over said sets of rotary worktables, respectively; an independent feed mechanism for each of said sets of cutter spindles for feeding its said set of cutter spindles between an operative position at and an inactive position relative to its said set of rotary worktables; and control means connected with each of said independent cutter spindle feed mechanisms for selectively operating said tracer member actuating means by operation of any one of said feed mechanisms to feed its said set of cutter spindles to operative position relative to its said set of rotary worktables to move said tracer member for the latter set of said rotary worktables to operative position.

9. In a multiple spindle duplicating machine, in combination, a supporting frame structure; a table assembly mounted on said frame structure for and constrained to movements in either direction along a predetermined path of movement; sets of rotary worktables mounted on said table assembly for independent rotation thereon and being movable bodily as a unit therewith; an independent powered drive mechanism for each of said sets of rotary worktables in driving connection therewith; sets of rotary cutter spindles supported in normally fixed positions from said frame structure in locations over said sets of rotary worktables, respectively; each of said sets of cutter spindles being mounted for movements axially between operative position at and inactive position relative to its said set of rotary worktables; a feed mechanism for each said sets of cutter spindles operable independently of the feed mechanisms for said other sets of cutter spindles; a master profile means for each of said sets of rotary worktables selectively operable to either control and dictate the movements of said table assembly along its said predetermined path of movement from its said set of rotary worktables or to release such control; mechanism under the selective control of said independent cutter spindle feed mechanisms operable by feed of a set of said cutter spindles to operative position at its said set of rotary worktables to operate said master profile means for such set of worktables to control and dictate the movements of said table assembly from said latter set of rotary worktables; and interlock mechanism connecting each independent cutter spindle feed mechanism with the powered drive mechanism for each of said sets of rotary worktables for the other of said sets of cutter spindles for rendering said powered drive mechanism inactive when a feed mechanism for any other said set of cutter spindles is operated to feed its said set of cutter spindles to operative position.

10. In a multiple spindle duplicating machine, in combination, a supporting frame structure; a table assembly mounted on said frame structure for and constrained to movements in either direction along a predetermined path of movement; independent sets of rotary worktables mounted in fixed positions on said table assembly for rotation about axes substantially normal to said predetermined path of movement; a powered drive mechanism for each of said sets of rotary worktables; sets of rotary cutter spindles supported from said frame structure independently of and in locations over said sets of rotary worktables, respectively; each of said sets of cutter spindles being mounted for movements between an operative position at and an inactive position relative to its said set of rotary worktables; a feed mechanism for each of said sets of cutter spindles operable independently of said feed mechanisms of said other of said sets of cutter spindles; an interlock mechanism connecting said feed mechanism of each of said sets of cutter spindles with said powered drive mechanism of a set of said rotary worktables other than its said set of rotary worktables for rendering said powered drive mechanism for said other of said sets of rotary worktables inoperative when said feed mechanism is operated to feed its said set of cutter spindles to operative position; a master profile means for each of said sets of rotary worktables operable between a position controlling and dictating the movements of said table assembly and all of said sets of rotary worktables thereon as a unit assembly along said predetermined path of movement and an inactive position relative to its said set of rotary worktables; actuating means for selectively moving any one of said master profile means into active position relative to its said set of rotary worktables; and means controlled by said feed mechanisms of said sets of cutter spindles for operating said actuating means to selectively move that one of said master profile means into active position with that one of said sets of rotary worktables to which said set of cutter spindles for said latter set of rotary cutter spindles is fed to operative position.

11. In a multiple spindle duplicating machine, in combination, a supporting frame structure; sets of rotary worktables supported from said frame structure for movements bodily together as a unit assembly in either direction along and constrained to a predetermined path of movement; sets of rotary cutter spindles supported from said frame structure in locations over said sets of rotary worktables, respectively; each of said sets of cutter spindles being mounted for movements between an operative position at and an inactive position relative to its said set of worktables; a feed mechanism for feeding each of said sets of cutter spindles between its said operative and inactive positions independently of said other of said sets of cutter spindles; a master profile means for each of said sets of rotary worktables operable between an inactive position and an operative position controlling and dictating from its said set of rotary worktables the movements together of all of said sets of rotary worktables as a unit assembly along said predetermined path; means for selectively operating any one of said master profile means to its operative position and said other of said master profile means to inactive position; a powered drive mechanism for each of said sets of rotary worktables for rotating its said set of rotary worktables independently of said other of said sets of rotary worktables; and means selectively operable by operation of any one of said master profile means to its said operative position for rendering said powered drive mechanisms of said other of said sets of worktables inoperative.

12. In the combination as defined in claim 11, an interlock means connecting one of said feed mechanisms with said powered drive mechanism for another of said sets of rotary worktables for rendering said drive mechanism inoperative when said feed mechanism is operated to feed its said set of cutter spindles to operative position.

13. In a multiple spindle duplicating machine, in combination, a supporting frame structure; sets of rotary worktables supported from said frame structure in position spaced apart thereon for rotation about substantially parallel axes; an independent powered drive mechanism for each of said sets of rotary worktables; sets of rotary cutter spindles mounted on said frame structure independently of and in positions over said sets of rotary worktables, respectively; each of said sets of cutter spindles being each mounted for feeding movements between an operative position at and an inactive position relative to its said set of rotary worktables; a feed mechanism for each of said sets of cutter spindles operable to feed such set of cutter spindles independently of said other of said sets of said cutter spindles; and an interlock mechanism operatively connecting each feed mechanism of a set of said cutter spindles with a powered drive mechanism for a set of said rotary worktables associated with another of said sets of cutter spindles for rendering the latter powered drive mechanism inactive when said set of cutter spindles with which said interlock mechanism is connected is fed to operative position at its said set of rotary worktables.

14. In a multiple spindle machine, in combination, a supporting frame structure; sets of rotary worktables rotatably mounted on said frame structure; an independent powered drive mechanism for the rotary worktables of each of said sets of rotary worktables; work clamping mechanisms mounted on the worktables of each of said sets of rotary worktables; an operating means for actuating said work clamping mechanisms of each of said sets of rotary worktables between work clamping and unclamping positions; sets of rotary cutter spindles supported from said frame structure independently of and in locations over said sets of rotary worktables respectively; each of said sets of cutter spindles being mounted for movements between operative position at and inactive position relative to its said set of rotary worktables; a cutter spindle feed mechanism for each of said sets of cutter spindles operable independently of said feed mechanisms for said other sets of cutter spindles; an interlock mechanism operatively connecting each feed mechanism of each of said sets of cutter spindles with a powered drive mechanism of a set of said rotary worktables other than said set thereof with which such set of cutter spindles is associated for rendering said powered drive mechanisms for said other sets of worktables inoperative when such set of cutter spindles is fed to its operative position; and an interlock mechanism connected between said means for operating said work clamping mechanisms of each of said sets of rotary worktables with said powered drive mechanism for such set of worktables for rendering said powered drive mechanism inoperative when said work clamping mechanisms are in unclamped positions and operative when said work clamping mechanisms are in clamping positions.

15. In the combination as defined in claim 11, a work clamping mechanism mounted on each of said sets of rotary worktables; each of said clamping mechanisms being operable between a work clamping position and a work releasing position; independent means for controlling the operation of said work clamping mechanisms of each of said sets of rotary worktables; an interlock means connecting said independent operating means for said work clamping mechanisms of each of said sets of rotary worktables with said powered drive mechanism for such set of rotary worktables for rendering the latter powered drive mechanism operative when said work clamping mechanisms are in work clamping position and for rendering such powered drive mechanism inoperative when said work clamping mechanisms are in work releasing positions.

16. In a multiple spindle duplicating machine, in combination, a supporting frame structure; sets of rotary worktables supported from said frame structure for movements bodily together as a unit assembly in either direction along and constrained to a predetermined path of movement; a work clamping mechanism mounted on said worktables of each of said sets of worktables and being operable between a work clamping position and a work releasing position; independent means for controlling the operation of said work clamping mechanisms of each of said sets of rotary worktables; sets of rotary cutter spindles supported from said frame structure in locations over said sets of rotary worktables, respectively; a powered drive mechanism for each of said sets of rotary worktables for rotating said worktables independently of said other of said sets of rotary worktables; a master profile means for each of said sets of rotary worktables operable between an inactive position and a position controlling and dictating from its said set of rotary worktables the movements of all of said sets of rotary worktables together as a unit assembly along said predetermined path of movement; means for selectively operating any one of said profile master means to its said operative position and said other of said master profile means to said inactive position; means operated by operation of any one of said master profile means to its said operative position for rendering said drive mechanism of said other of said sets of rotary worktables inoperative; and; an interlock means connecting said independent operating means for said work clamping mechanisms of each of said sets of rotary worktables with said powered drive mechanism for such set of worktables for rendering the latter drive mechanism operative when said work clamping mechanisms are in work clamping position and inoperative when said work clamping mechanisms are in work releasing position.

17. In a duplicating machine, in combination, a supporting frame structure; sets of rotary worktables supported from said frame structure for movements bodily as a unit assembly in either direction along a predetermined path of movement; said rotary worktables of said sets of rotary worktables being each mounted for rotation about an axis substantially normal to said predetermined path of movement of said sets of rotary worktables; a master profile means for each of said sets of rotary worktables; each said master profile means being operable between an inactive position relative to its said set of rotary worktables and an operative position relative thereto for dictating and controlling from its said set of rotary worktables all of said sets of rotary worktables together as a unit assembly along said predetermined path of movement; and means for selectively operating any one of said master profile means to its said operative position and simultaneously operating said other of said master profile means for the other of said sets of rotary worktables to said inactive position.

18. In a multiple spindle duplicating machine, in combination, a table assembly mounted for and constrained to movements in either direction along a predetermined path; sets of rotary worktables mounted on and carried by said table assembly for rotation thereon about axes substantially normal to said predetermined path of movement of said table assembly; a set of rotary cutter spindles for each of said sets of rotary worktables mounted independently thereof in position thereover; an independent powered drive mechanism on said table assembly for and in driving connection with each set of said rotary worktables; said independent powered drive mechanisms being each normally inactive; a feed mechanism for each of said sets of cutter spindles operable to feed such set independently of said other sets of cutter spindles toward and from operative position at its said set of rotary worktables; a profile master controlled means for each of said sets of rotary worktables; each of said profile master controlled means being operable between an inactive position and an operative position for controlling and dictating solely from its said set of worktables the movements of said table assembly and all of said other sets of said rotary worktables thereon as a unit assembly along said predetermined path; means for selectively operating any one of said master profile means to its said operative position and said other of said master profile means to said inactive position; and means for selectively effecting operation solely of said independent powered drive mechanism for that set of said rotary worktables having its said master profile means in operative position.

19. In a multiple spindle duplicating machine, in combination, a supporting frame structure; a table assembly mounted on said frame structure for and constrained to movements in either direction along a predetermined linear path of movement; sets of rotary worktables mounted on and movable as a unit assembly with said table assembly; each of said rotary worktables of said sets of said rotary worktables being also mounted on said table assembly for rotation about an axis substantially normal to said predetermined linear path of movements of said worktable assembly; an independent powered drive mechanism on said table assembly for each said set of said rotary worktables; a set of rotary cutter spindles supported from said supporting frame structure independently of and in position over each said set of rotary worktables for movements between operative position and an inactive position relative to its said set of worktables; a feed mechanism for each of said sets of cutter spindles for feeding its set of cutter spindles between inactive position and operative position; each of said feed mechanisms being operatively connected with its said set of cutter spindles for feeding its said set of cutter spindles independently of said other sets of cutter spindles; a master profile cam member for and rotatable with each of said sets of rotary worktables; a tracer member for each of said profile cam members; each of said tracer members being mounted and supported from said frame structure for movements between an inactive position disengaged from and an operative position in tracing engagement by its said master profile cam member; mechanism for selectively moving any one of said tracer members to its said operative position in tracing engagement by its said master cam member and the other of said tracer members to inactive position; and means selectively operable by said feed mechanisms for said sets of cutter spindles for causing said tracer member moving mechanism to move any one of said tracer members into operative position with its said master profile cam member in accordance with that set of cutter spindles fed to operative position by its said feed mechanism.

References Cited in the file of this patent

UNITED STATES PATENTS

| | | |
|---|---|---|
| 2,234,320 | Rosen | Mar. 11, 1941 |
| 2,443,793 | Lensky et al. | June 22, 1948 |
| 2,535,896 | Buckles et al. | Dec. 26, 1950 |
| 2,590,378 | Clausing | Mar. 25, 1952 |
| 2,696,066 | Roehm | Dec. 7, 1954 |

FOREIGN PATENTS

| | | |
|---|---|---|
| 574,399 | Germany | Apr. 12, 1933 |